(12) United States Patent
Woo et al.

(10) Patent No.: US 11,285,975 B1
(45) Date of Patent: Mar. 29, 2022

(54) SELF-GENERATING DEVICE AND MECHANICAL SYSTEM USING THE SAME

(71) Applicants: Young Suk Woo, Los Angeles, CA (US); Chang Deuk Woo, Los Angeles, CA (US)

(72) Inventors: Young Suk Woo, Los Angeles, CA (US); Chang Deuk Woo, Los Angeles, CA (US)

(*) Notice: Subject to any disclaimer, the term of this patent is extended or adjusted under 35 U.S.C. 154(b) by 0 days.

(21) Appl. No.: 17/510,200

(22) Filed: Oct. 25, 2021

(51) Int. Cl.
| | | |
|---|---|---|
| *B60K 25/02* | (2006.01) |
| *B61C 9/10* | (2006.01) |
| *B63H 23/06* | (2006.01) |
| *H02K 7/00* | (2006.01) |
| *H02K 7/08* | (2006.01) |
| *H02K 9/02* | (2006.01) |
| *H02K 9/06* | (2006.01) |
| *B63H 23/24* | (2006.01) |
| *H02N 11/00* | (2006.01) |

(52) U.S. Cl.
CPC ............... *B61C 9/10* (2013.01); *B60K 25/02* (2013.01); *B63H 23/06* (2013.01); *H02K 7/006* (2013.01); *H02K 7/08* (2013.01); *H02K 9/02* (2013.01); *H02K 9/06* (2013.01); *B60K 2025/022* (2013.01); *B63H 23/24* (2013.01); *H02N 11/002* (2013.01)

(58) Field of Classification Search
CPC .......... B61C 9/10; B63H 23/06; B63H 23/24; H02K 7/006; H02K 7/08; H02K 9/02; H02K 9/06; B60K 2025/022
See application file for complete search history.

*Primary Examiner* — Sean Gugger

(57) ABSTRACT

A self-generating device equipped in a mechanical system including a power generating part, an operating part, and a main shaft, the self-generating device comprising: the main shaft rotating according to a rotational force powered by the power generating part and transferring the rotational force to the operating part, wherein the operating part performs mechanical motion using the transferred rotational force; a rotor assembly combined with the main shaft and rotating along with the main shaft according to the rotational force, and a stator assembly surrounding the rotor assembly and staying stationary relative to the rotation of the rotor assembly, wherein magnetic field around the rotor assembly and the stator assembly changes according to the rotation of the main shaft, and the self-generating device generates induced electricity.

16 Claims, 32 Drawing Sheets

SELF-GENERATING DEVICE AND MECHANICAL SYSTEM USING THE SAME

FIELD OF THE INVENTION

The present invention relates to a generator, more particularly to a device generating electricity using mechanical energy.

BACKGROUND OF THE INVENTION

With the development of the internal combustion engine, the world relies tremendously on transportation, which provides mobility to passengers and freight. Accordingly, the transportation sector is a primary energy consumer of the world's petroleum and derivatives such as gasoline and diesel.

Since the high usage of the fossil fuels in the transport sector is contributing to critical air pollution and global warming, effective measures or alternatives are required.

To solve the problem mentioned above, the present invention suggests a self-generating device and a mechanical system using the self-generating device, which can be used as sustainable energy and contribute reduction of air pollution and green-house gases.

SUMMARY OF THE INVENTION

According to one embodiment of the present invention, a self-generating device equipped in a mechanical system including a power generating part, an operating part, and a main shaft connecting between the power generating part and the operating part, the self-generating device comprising: the main shaft rotating according to a rotational force powered by the power generating part and transferring the rotational force to the operating part, wherein the operating part performs mechanical motion that the mechanical system aims at, using the transferred rotational force; a rotor assembly combined with the main shaft and rotating along with the main shaft according to the rotational force, and a stator assembly surrounding the rotor assembly and staying stationary relative to the rotation of the rotor assembly, wherein the at least one of the rotor assembly and the stator assembly generates a magnetic field, and the other one or both have wire windings in which change of the magnetic field induces electricity.

The mechanical system is an automobile, the power generating part is an engine, and the operating part is wheels, wherein the main shaft is a drive shaft connected to the engine and receives the rotational force from the engine.

The mechanical system is an automobile, the power generating part is an engine, and the operating part is wheels, wherein the main shaft is an axle shaft connecting a pair of the wheels, wherein the axle shaft receives the rotational force from the engine through a differential and a drive shaft connecting between the engine and the axle shaft.

The self-generating device further comprises a battery receiving the induced electricity from the wire windings and transferring the induced electricity to the mechanical system.

The self-generating device further comprises a bearing mounted on a side of a set of the rotor assembly and the stator assembly, the bearing including: an inner bearing having a first race, a second race surrounding the first race, and inner balls positioned between the first and the second race, and an outer bearing having the second race, a third race surrounding the second race, and outer balls positioned between the second and the third race.

A thickness of the second race is the same as any one of that of the first and the third race.

The main shaft includes at least one external screw portion positioned on at least one side of a set of the rotor assembly and the stator assembly, wherein the self-generating device further comprises a bearing mounted on the screw portion of the main shaft, wherein an internal side of a bore of the bearing has an internal screw portion that is engaged with the external screw portion of the main shaft.

The bearing including: an inner bearing having a first race, a second race surrounding the first race, and inner balls positioned between the first and the second race, and an outer bearing having the second race, a third race surrounding the third race, and outer balls positioned between the second and the third race.

The external screw portion includes a raised helical thread, and a width of the raised helical thread becomes wider as the raised helical thread is closer to the set of the rotor assembly and the stator assembly, and wherein the internal screw portion includes a depressed helical trench, and a width of the depressed helical trench becomes wider as the depressed helical trench is closer to the set of the rotor assembly and the stator assembly.

The rotor assembly includes a core, wire windings wound on the core, and two claw poles covering the core with the wire windings from both sides thereof, wherein the claw pole has a plurality of claws, and a tip of the claw is combined with a cooling fan, wherein the cooling fan has a long-shaped structure extended from the tip of the claw and has a long-shaped opening that enables air to pass therethrough.

The self-generating device further comprises a housing receiving a set of the rotor assembly and the stator assembly, and a cooling part combined with the housing, wherein the cooling part includes a duct having an external side combined with the housing and an internal passage that air passes through and communicates with an inside of the housing, wherein a diameter of the external side of the duct becomes narrower as the duct is away from the housing, and a diameter of the internal passage of the duct becomes wider as the duct is away from the housing, wherein the internal passage of the duct has a spiral helix protruded from an internal surface thereof, and a diameter of the spiral helix becomes wider as the duct is away from the housing.

The main shaft includes a vortex generating portion, and the vortex generating portion is positioned right next to a set of the rotor assembly and the stator assembly, and has a helical wing and a tube receiving the helical wing, wherein the helical wing is protruded from a surface of the main shaft and supplies vortex airflow through the tube toward the set of the rotor assembly and the stator assembly according to rotation of the main shaft.

The self-generating device further comprises a housing receiving a set of the rotor assembly and the stator assembly and a cooling part combined with the housing, wherein the tube is combined with the housing, and the vortex airflow is supplied to an inside of the housing through an opening of the housing, wherein the cooling part includes a duct having an external side combined with the housing and an internal passage that air passes through and communicates with the inside of the housing, wherein a diameter of the external side of the duct becomes narrower as the duct is away from the housing, and a diameter of the internal passage of the duct becomes wider as the duct is away from the housing.

The mechanical system is a railway vehicle including a plurality of axle shafts connecting a pair of wheels, the power generating part is an engine, and the operating part is the wheels, wherein the main shaft is a first axle shaft of the plurality of axle shafts, and a second axle shaft of the plurality of the axle shafts is connected to the engine and receives the rotational force from the engine, wherein the first axle shaft receives the rotational force through coupling rods connecting between the first and the second axle shaft at both ends thereof.

The self-generating device further comprises a battery receiving the induced electricity from the wire windings and transferring the induced electricity into the mechanical system.

The self-generating device further comprises a supplying wire connecting between the battery and common railway wirings that is connected to another railway vehicle, wherein the supplying wire transfers surplus electricity of the induced electricity stored in the battery to another railway vehicle.

The mechanical system is a ship, the power generating part is an engine, and the operating part is a propeller, wherein the main shaft is a propeller shaft connected to the engine and converting a mechanical power generated by the engine into the rotational force.

According to another embodiment of the present invention, a mechanical system equipped with a self-generating device, the mechanical system comprising: a power generating part generating power, a main shaft connected to the power generating part, receiving the power generated from the power generated part, and rotating with a rotational force using the power; an operating part receiving the rotational force from the main shaft and performing a mechanical motion that the mechanical system aims at, using the rotational force, and a self-generating part mounted on the main shaft and generating induced electricity using the rotational force, wherein the self-generating part including: the main shaft rotating according to the rotational force; a rotor assembly combined with the main shaft and rotating along with the main shaft according to the rotational force, and a stator assembly surrounding the rotor assembly and staying stationary relative to the rotation of the rotor assembly, wherein the at least one of the rotor and the stator generates a magnetic field and the other one or both have wire windings in which change of the magnetic field induces electricity.

The main shaft includes at least one external screw portion positioned on at least one side of a set of the rotor assembly and the stator assembly, and the self-generating device further comprises a bearing mounted on the screw portion of the main shaft, wherein the external screw portion includes a raised helical thread, and a width of the raised helical thread becomes wider as the raised helical thread is closer to the set of the rotor assembly and the stator assembly, wherein an internal side of a bore of the bearing has an internal screw portion that is engaged with the external screw portion of the main shaft, and wherein the bearing including: an inner bearing having a first race, a second race surrounding the first race, and inner balls positioned between the first and the second race, and an outer bearing having the second race, a third race surrounding the third race, and outer balls positioned between the second and the third race.

The rotor assembly includes a core, windings wound on the core, and two claw poles covering the core with the windings from the both sides thereof, wherein the claw pole has a plurality of claws, and a tip of the claw is combined with a cooling fan, and the cooling fan has a long-shaped structure extended from the tip of the claw and has a long-shaped opening that enables air to pass therethrough, wherein the self-generating part further includes a housing receiving a set of the rotor assembly and the stator assembly and a cooling part combined with the housing, and the cooling part includes a duct having an external side combined with the housing and an internal passage that air passes through and communicates with an inside of the housing, wherein a width of the external side of the duct becomes narrower as the duct is away from the housing, and a diameter of the internal passage of the duct becomes wider as the duct is away from the housing, wherein the internal passage of the duct has a spiral helix protruded from an internal surface thereof, and a diameter of the spiral helix becomes wider as the duct is away from the housing, wherein the main shaft includes a vortex generating portion having a helical wing and a tube receiving the helical wing, and positioned right next to a set of the rotor assembly and the stator assembly, wherein the helical wing is protruded from a surface of the main shaft and supplies vortex airflow through the tube toward the set of the rotor assembly and the stator assembly according to rotation of the main shaft.

BRIEF DESCRIPTION OF THE DRAWINGS

FIG. 3A is a magnified view of the bearing 105D shown in FIG. 2, and FIG. 3B is a cross-sectional view taken along line A-A of the bearing 105D shown in FIG. 2.

DETAILED DESCRIPTION OF THE INVENTIONS

Reference will now be made in detail to the preferred embodiments of the present invention, examples of which are illustrated in the accompanying drawings, which form a part of this disclosure. It is to be understood that this invention is not limited to the specific devices, methods, conditions or parameters described and/or shown herein, and that the terminology used herein is for the purpose of describing particular embodiments by way of example only and is not intended to be limiting of the claimed invention.

In addition, as used in the specification including the appended claims, the singular forms "a", "an", and "the" include the plural, and reference to a particular numerical value includes at least that particular value, unless the context clearly dictates otherwise. Ranges may be expressed herein as form "about" or "approximately" one particular value and/or to "about" or "approximately" another particular value. When such a range is expressed, another embodiment includes from the one particular value and/or to the other particular value. Similarly, when values are expressed as approximations, by use of the antecedent "about", it will be understood that the particular value forms another embodiment.

Hereafter, preferred embodiments of the present invention will be described in detail in conjunction with the accompanying drawings.

Figure 1A:
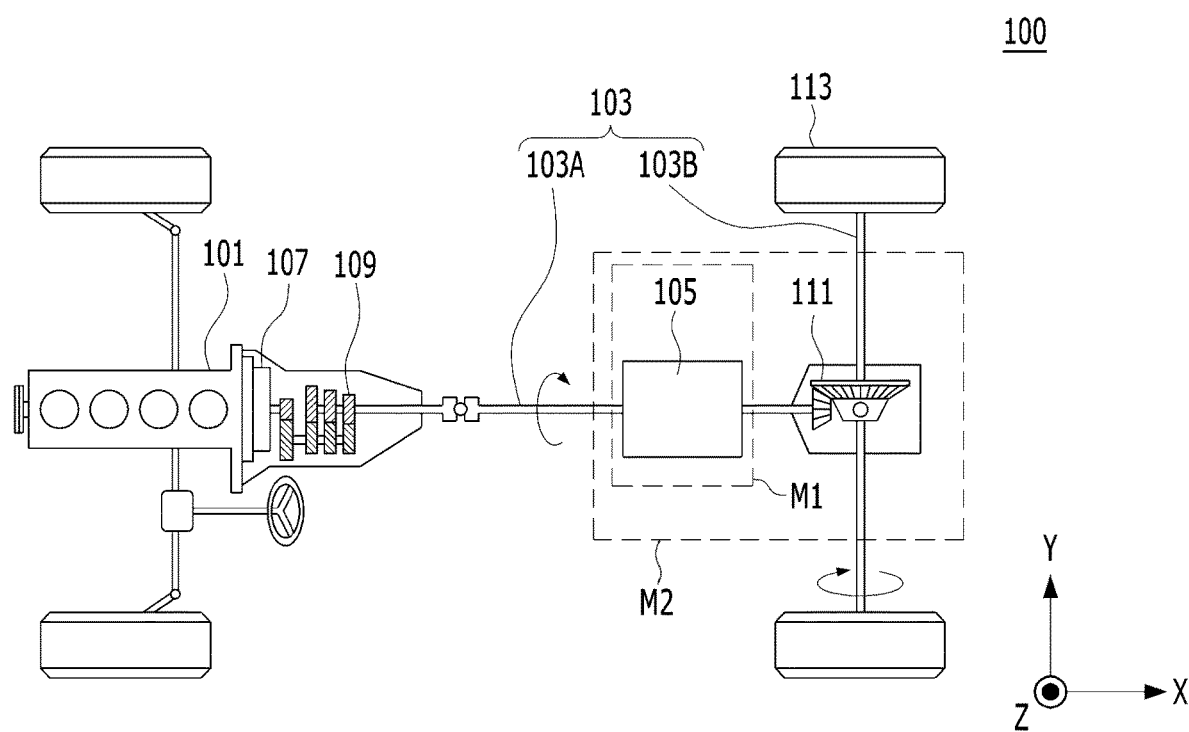
FIG. 1A is a top view schematically illustrating a self-generating device 105 and an automobile 100 equipped with the self-generating device 105 according to one embodiment of a self-generating device and a mechanical system using the same of the present invention.
Figure 2:
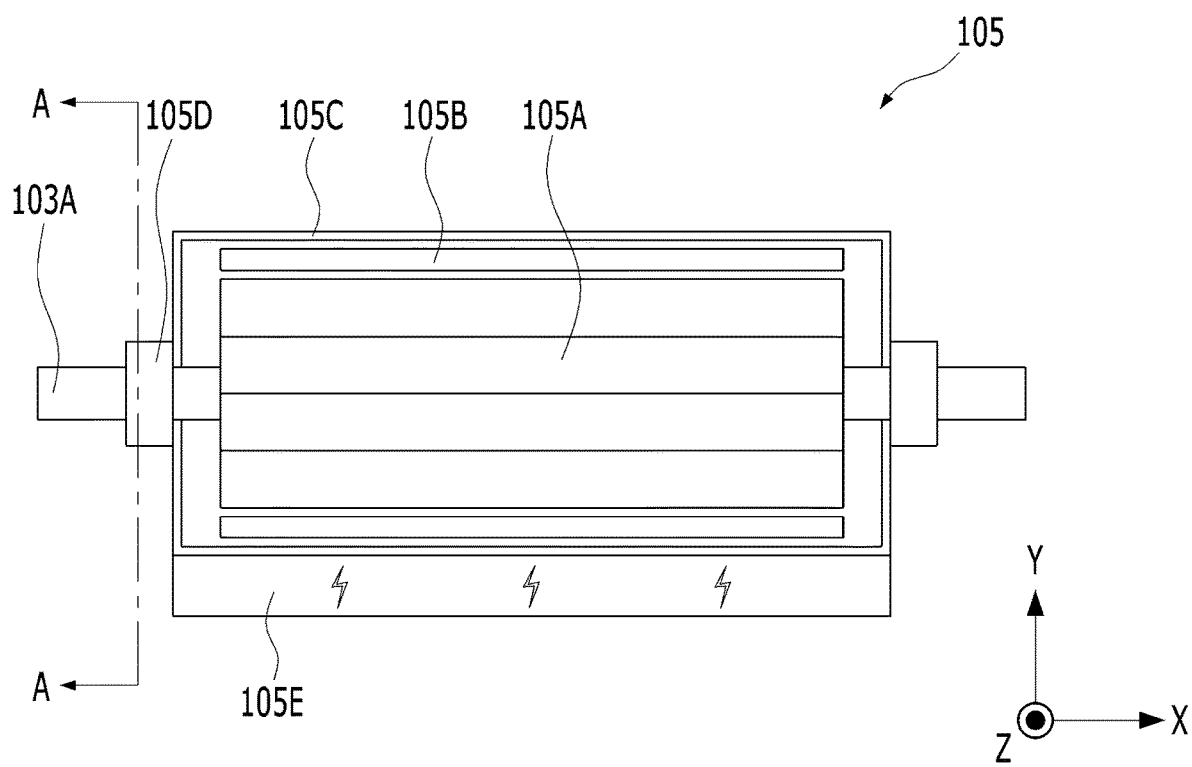
FIG. 2 is a cross-sectional view schematically illustrating a self-generating device 105 that may be applied as the self-generating device shown in FIGS. 1A and 1B according to one embodiment of the present invention.
Figure 3A:
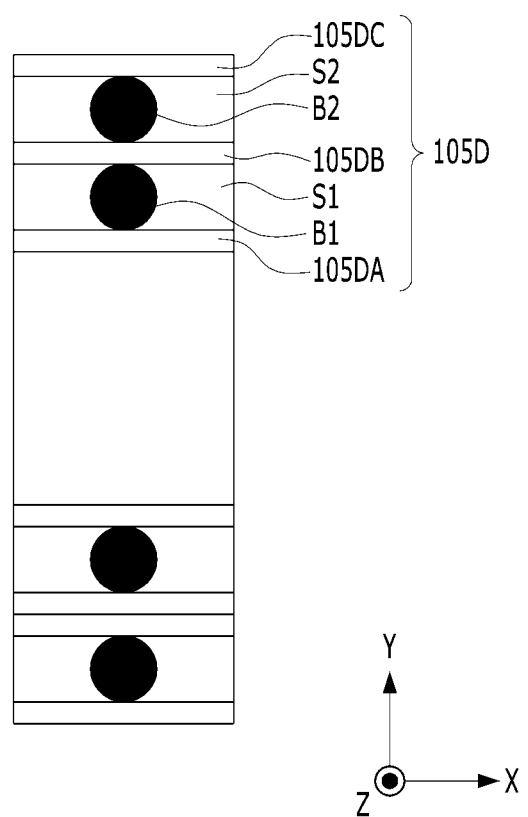
FIGS. 3A and 3B are drawings schematically illustrating a bearing 105D of the self-generating device 105 shown in FIG. 2 according to one embodiment of the present invention.
Figure 3B:
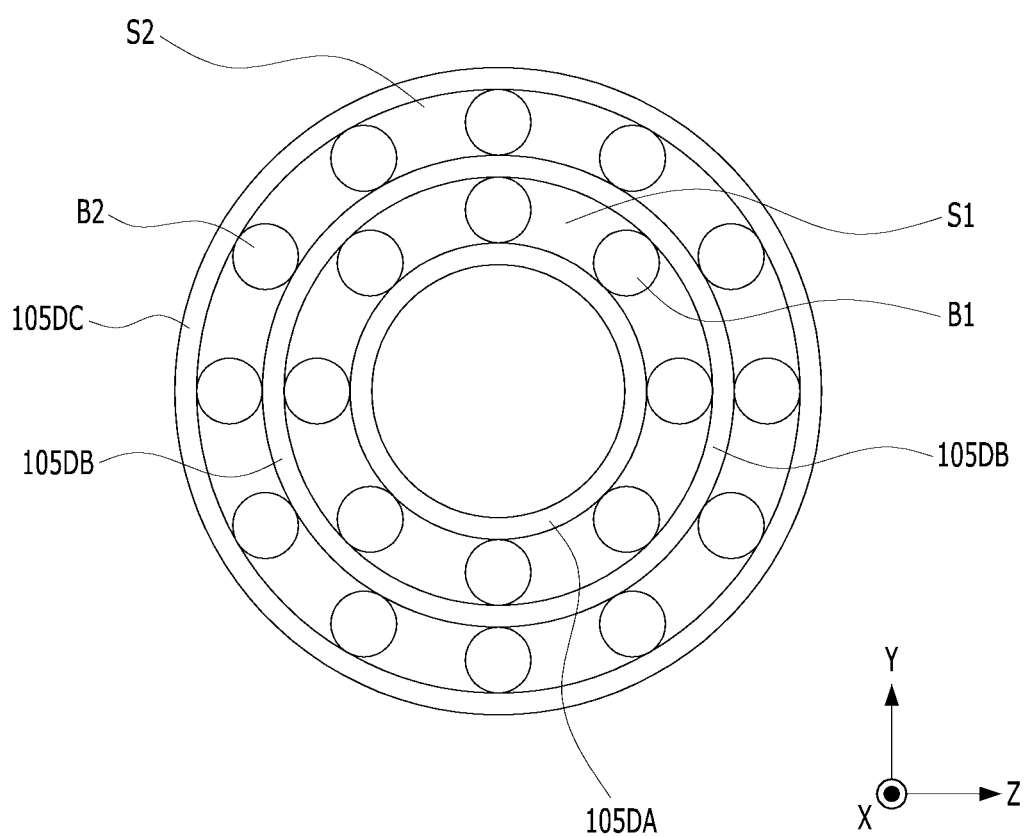
Figure 4A:
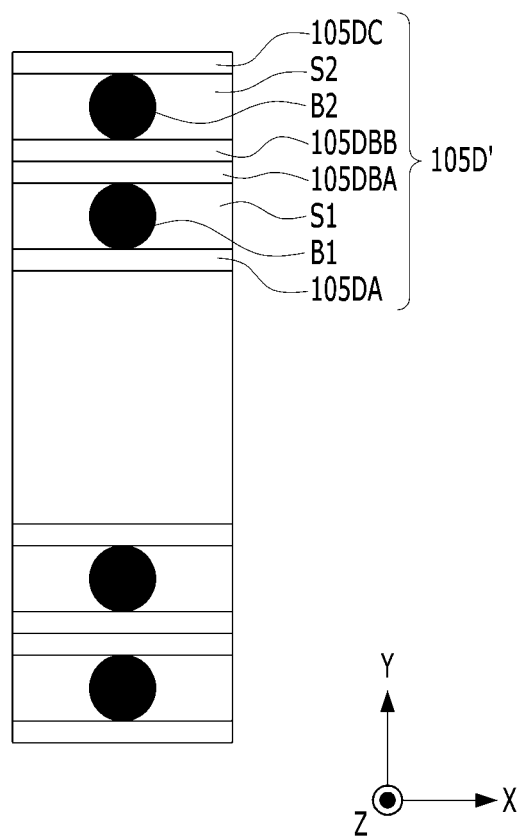
FIGS. 4A and 4B are drawings views schematically illustrating a bearing 105D' that may be applied as the bearing shown in FIG. 2 according to another embodiment of the present invention.
Figure 4B:
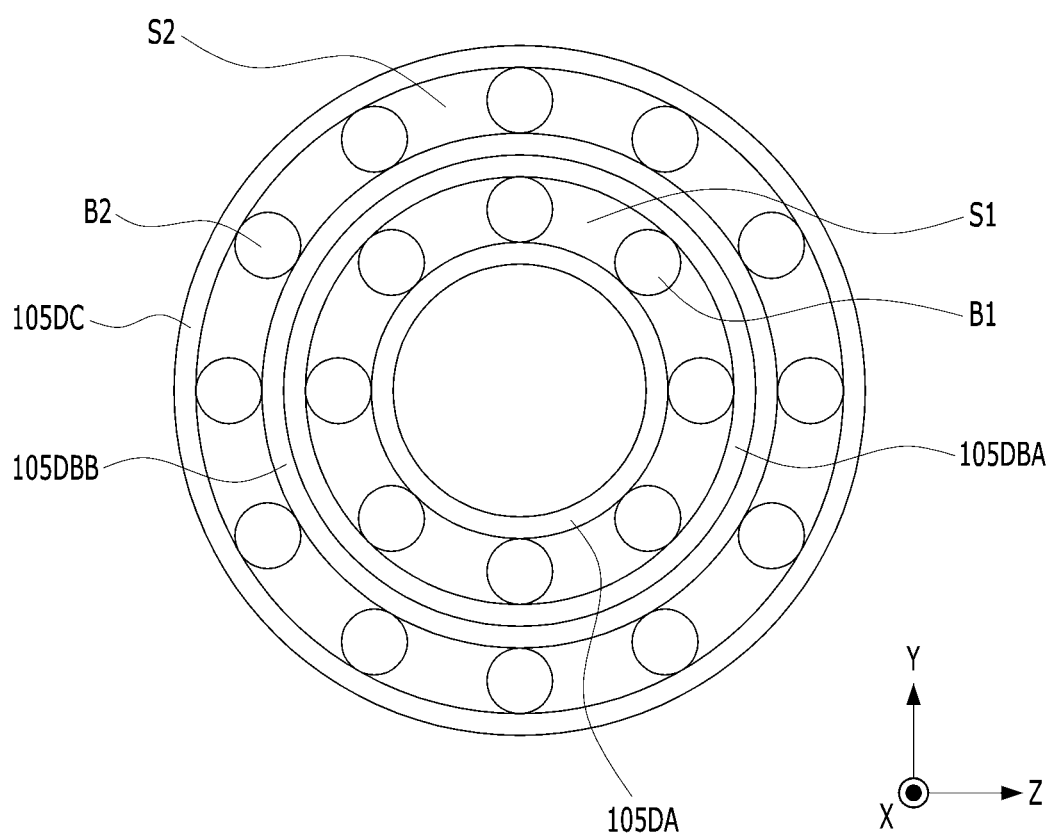

FIG. 1A is a top view schematically illustrating a self-generating device 105 and an automobile 100 equipped with the self-generating device 105 according to one embodiment of a self-generating device and a mechanical system using the same of the present invention. FIG. 2 is a cross-sectional view schematically illustrating a self-generating device 105 that may be applied as the self-generating device shown in FIGS. 1A and 1B according to one embodiment of the present invention. FIGS. 3A and 3B are drawings schematically illustrating a bearing 105D of the self-generating device 105 shown in FIG. 2 according to one embodiment of the present invention. FIG. 3A is a magnified view of the bearing 105D shown in FIG. 2, and FIG. 3B is a cross-sectional view taken along line A-A of the bearing 105D shown in FIG. 2. FIGS. 4A and 4B are drawings views schematically illustrating a bearing 105D' that may be applied as the bearing shown in FIG. 2 according to another embodiment of the present invention.

Referring to FIGS. 1A and 2, the self-generating device 105 is equipped in a mechanical system 100. The mechanical system 100 may include an engine 101, a clutch 107, a transmission 109, a drive shaft 103A, a self-generating device 105, a differential 111, an axle shaft, and wheels 113.

The engine 101 generates mechanical power and transfers a rotational force to the transmission 109 through the clutch 107 to drive the system of the automobile 100. In FIG. 1A, the engine 101 is positioned at the front axle shaft of the automobile 100, but the present invention is not limited to. The engine 101 may be positioned at the rear axle shaft, the drive shaft, or any place of the automobile 100.

The clutch 107 acts as a mechanical linkage between the engine 101 and the transmission 109, and briefly disconnects the engine 101 from the transmission 109 to change gears when the clutch pedal is depressed. The transmission 109 adjusts the speed of the rotation transferred from the engine 101 to operate the automobile 100 at an appropriate speed for starting, stopping, accelerating, and decelerating travel. The transmission 109 is connected to the drive shaft 103A, and the rotation with the adjusted speed by the transmission 109 is transferred to the drive shaft 103A.

The drive shaft 103A rotates at the adjusted speed, which is powered by the engine 101 and transferred through the clutch 107 and the transmission 109. The adjusted speed by the transmission 109 is still high enough to drive the automobile 100 properly, and changeable from high speed to low speed during starting, driving, and stopping of the automobile 100. The drive shaft 103A is connected to the axle shaft 103B through the differential 111 and transfers the rotational force.

The differential 111 may include a pinion gear connected to the drive shaft 103A and a spiral bevel gear connected to the axle shaft 103B. These gears enable the right and left axle shaft 103B to receive different speeds respectively, by adjusting the rotation speed transferred from the drive shaft 103A.

The axle shaft 103B rotates with a rotational force transferred from the drive shaft 103A, and transfers the rotational force to a pair of the wheels 113. In this instance, the right and the left axle shaft 103B may rotate at different speeds by the differential 111, thereby allowing the right and the left wheel to rotate at the different speeds and enabling the automobile 100 to turn direction.

With parts of the automobile 100, the engine 101, the drive shaft 103, and wheels 113, the automobile 100 can perform mechanical motion that it aims at, such as driving or turning direction.

The self-generating device 105 combines with the drive shaft 103A and generates electricity using the rotation of the drive shaft 103A. The self-generating device 105 may include the drive shaft 103A, a rotor assembly 105A, a stator assembly 105B, a housing 105C, a bearing 105D, and a battery 105E.

The rotor assembly 105A is combined with the drive shaft 103A and rotates along with the drive shaft 103A according to its rotational force. Specifically, referring to FIGS. 12 and 13 together, the rotor assembly 105A may include a core 105AC, wire windings 105AB wound on the core 105AC, and two claw poles 105AA covering the core 105AC with the windings 105AB from both sides thereof.

The stator assembly 105B surrounds the rotor assembly 105A, is affixed to a body (not shown) of the automobile 100, and stays stationary relative to the rotation of the rotor assembly 105A. The stator assembly 105B may include a core 105BA and wire windings 105BB wound on the core 105BA. With the rotation of the rotor assembly 105A, magnetic field formed by the cores 105AC, 105BA change, thereby inducing electricity in the windings 105AB, 105BB.

The battery 105E may receive the induced electricity from the wire windings 105AB, 105BB and transfer the induced electricity to the other parts of automobile 100, which requires electricity.

Due to the high speed and a wide change in speed, the self-generating device 105 equipped in the automobile 100 can generate sufficient amount of electricity required for starting the automobile 100, operating a control system of the automobile 100, and so on.

Figure 12:
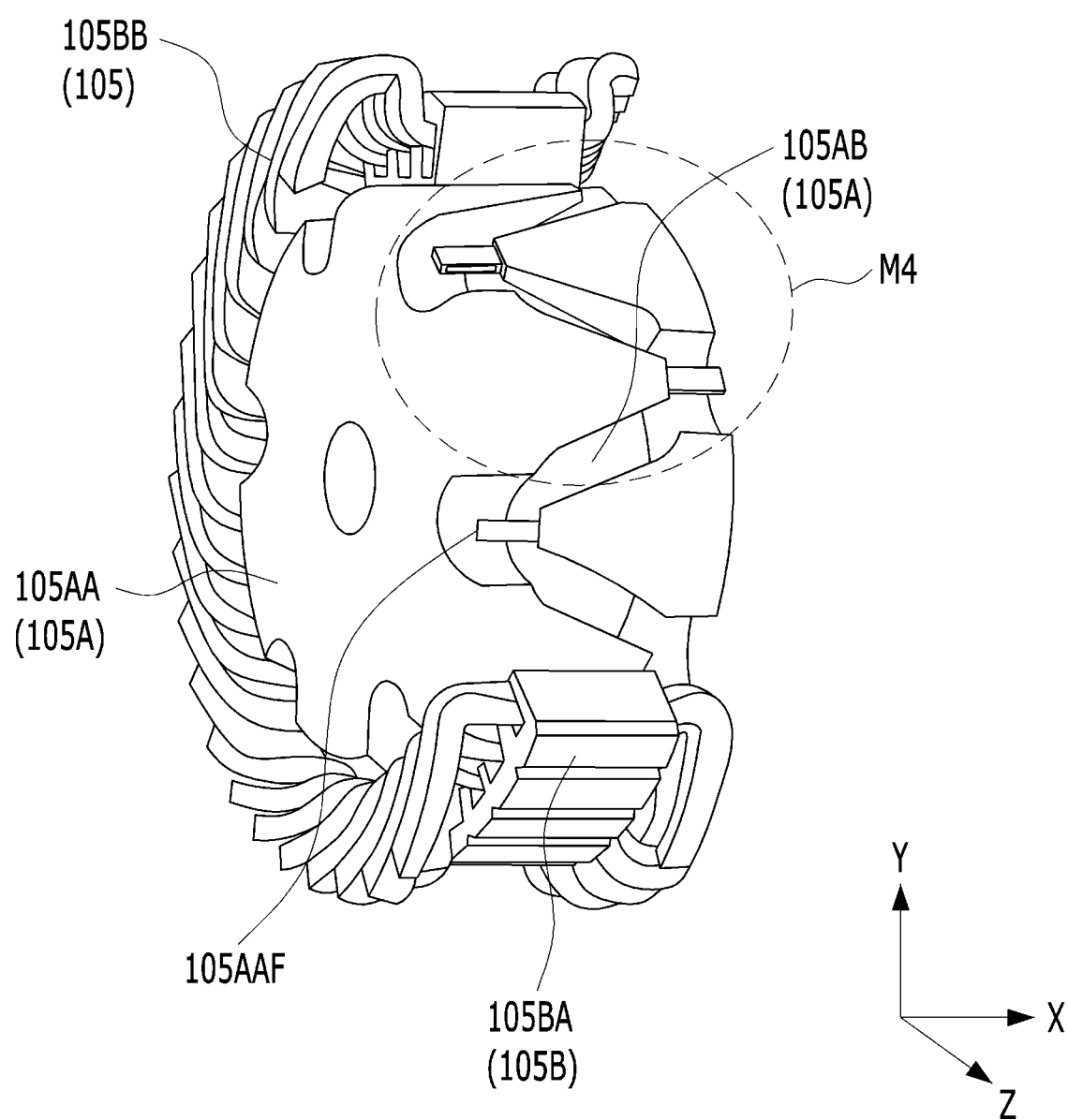
FIG. 12 is a perspective view schematically illustrating a rotor assembly 105A and a stator assembly 105B of the self-generating device 105 shown in FIGS. 1A and 1B.
Figure 13:
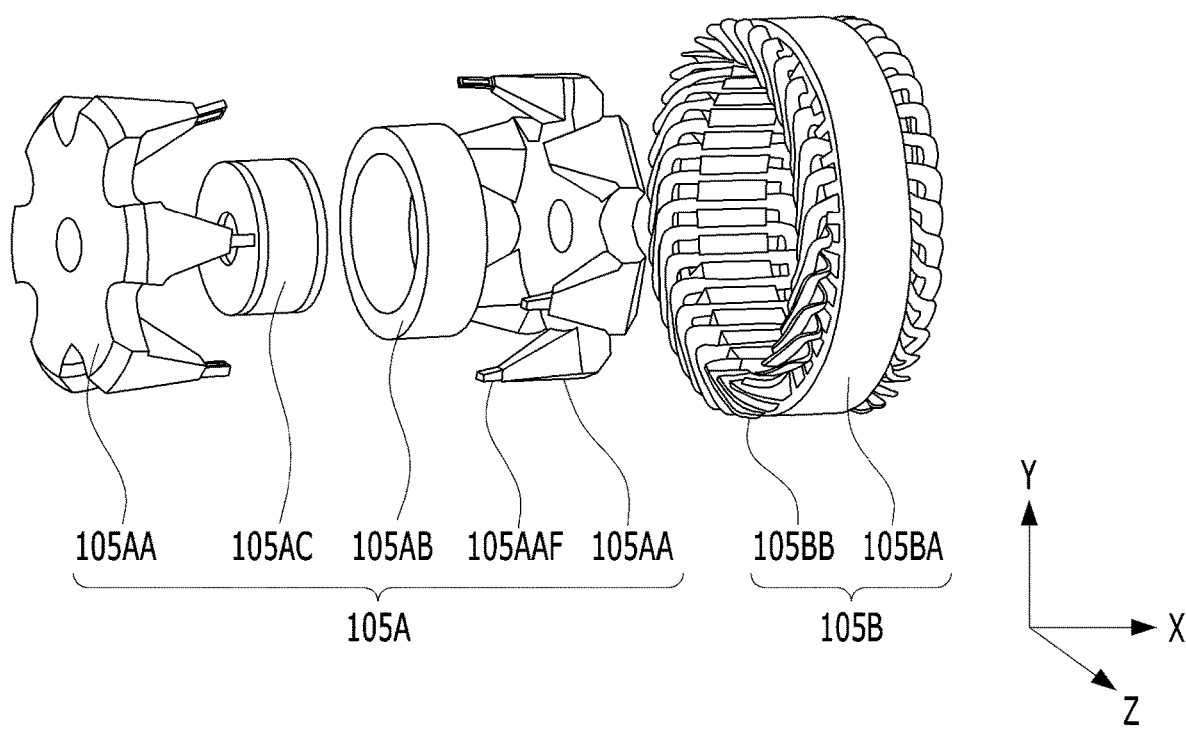
FIG. 13 is an exploded view schematically illustrating a rotor assembly 105A and a stator assembly 105B of the self-generating device 105 shown in FIGS. 1A and 1B.

In FIGS. 12 and 13, both the rotor assembly 105A and the stator assembly 105B have cores generating magnetic fields and wire windings having induced electricity, but the present invention is not limited to. In some embodiments, at least one of the rotor assembly 105A and the stator assembly 10B generates a magnetic field, and the other one or both have wire windings in which change of the magnetic field induces electricity.

Referring to FIGS. 2, 3A, and 3B, the bearing 105D is mounted on a side of a set of the rotor assembly 105A and the stator assembly 105B. The bearing 105D may include an inner bearing having a first race 105DA, a second race 105DB surrounding the first race 105DA, and inner balls B1 positioned in a space S1 between the first and the second race 105DA, 105DB, and an outer bearing having the second race 105DB, a third race 105DC surrounding the second race 105DB, and outer balls B2 positioned in a space S2 between the second and the third race 105DB, 105DC.

Since the bearing 105D has a double bearing structure including the inner and the outer bearing, when any one of the inner and the outer bearing breaks down, the other one can replace the broken one, thereby enabling the automobile 100 to keep operating. In this instance, a thickness of the second race 105DB is the same as any one of that of the first and the third race 105DA, 10DC. Since the inner and the outer bearing shares the second race 105DB, the cost for manufacturing the bearing 105D can be reduced.

The bearing 105D having the double bearing structure can endure the high-speed rotation of the drive shaft 103A, caused by high-speed driving of the automobile 100, and can protect the self-generating device 100.

In other embodiments, the self-generating device 105 may have a bearing 105D1 shown in FIGS. 4A and 4B. Referring to FIGS. 4A and 4B, a bearing 105D' may have a double bearing structure including an inner bearing having a first race 105DA, a second race 105DBA surrounding the first race 105DA, and inner balls B1 positioned in a space S1 between the first and the second race 105DA, 105DBA, and an outer bearing having a third race 105DBB, a fourth race 105DC surrounding the third race 105DBB, and outer balls B2 positioned in a space S2 between the third and fourth race 105DBB, 105DC.

Figure 1B:
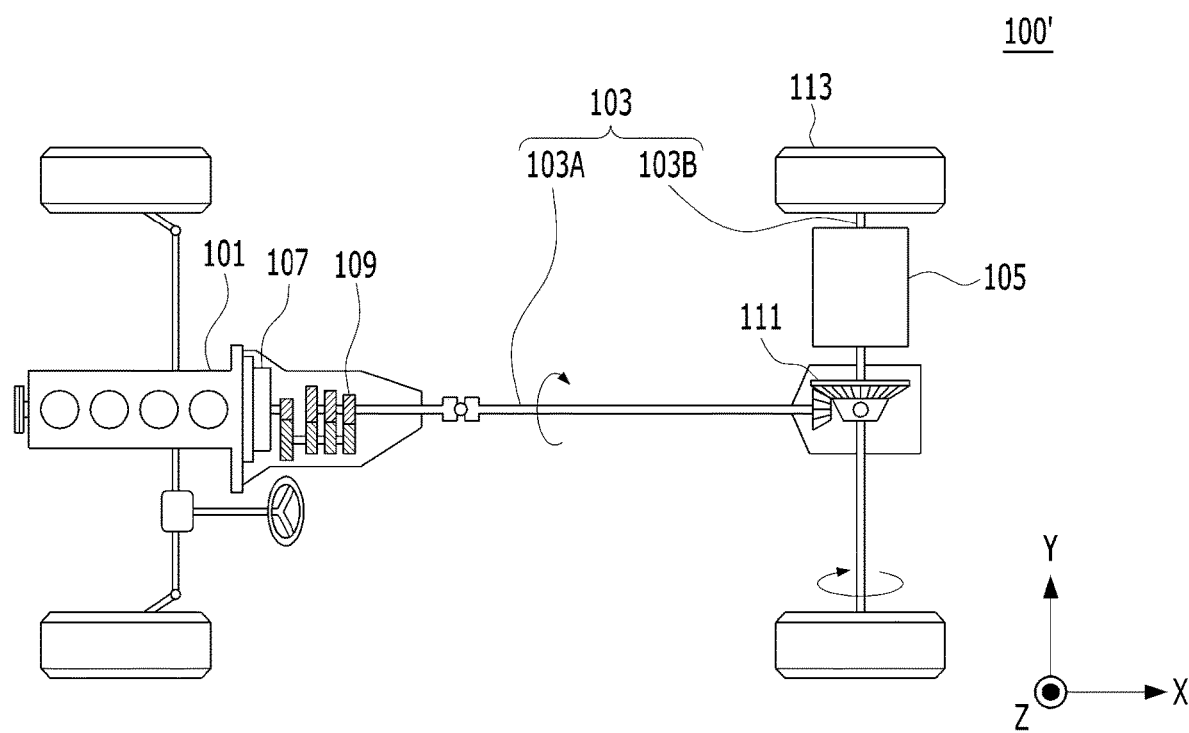
FIG. 1B a top view schematically illustrating a self-generating device 105 and an automobile 100' equipped with the self-generating device 105 according to another embodiment of a self-generating device and a mechanical system using the same of the present invention.

FIG. 1B a top view schematically illustrating a self-generating device 105 and an automobile 100' equipped with the self-generating device 105 according to another embodiment of a self-generating device and a mechanical system using the same of the present invention.

Referring to FIG. 1B, the automobile 100' in FIG. 1B is similar to the automobile 100 in FIG. 1A, but the self-generating device 105 is positioned on the axle shaft 103B instead of on the drive shaft 103A. Likewise, the self-generating device 105 may be mounted on any rotating shaft portion of the automobile 100, 100'.

In the embodiments in FIGS. 1A to 4, the mechanical system according to the present invention is embodied as the automobile 100, 100', the power generating part as an engine 101, the operating part as wheels 113, and main shaft as a drive shaft 103A, but is not limited to. The present invention may be applied to any mechanical system including a power generating part, an operating part, a rotating main shaft, and a self-generating device combined with the rotating main shaft. In some embodiments, the mechanical system may be a vehicle system such as a railway vehicle, a ship, but is not limited to. Detailed description regarding other embodiments will be explained later referring to FIGS. 20 to 25.

Figure 5:
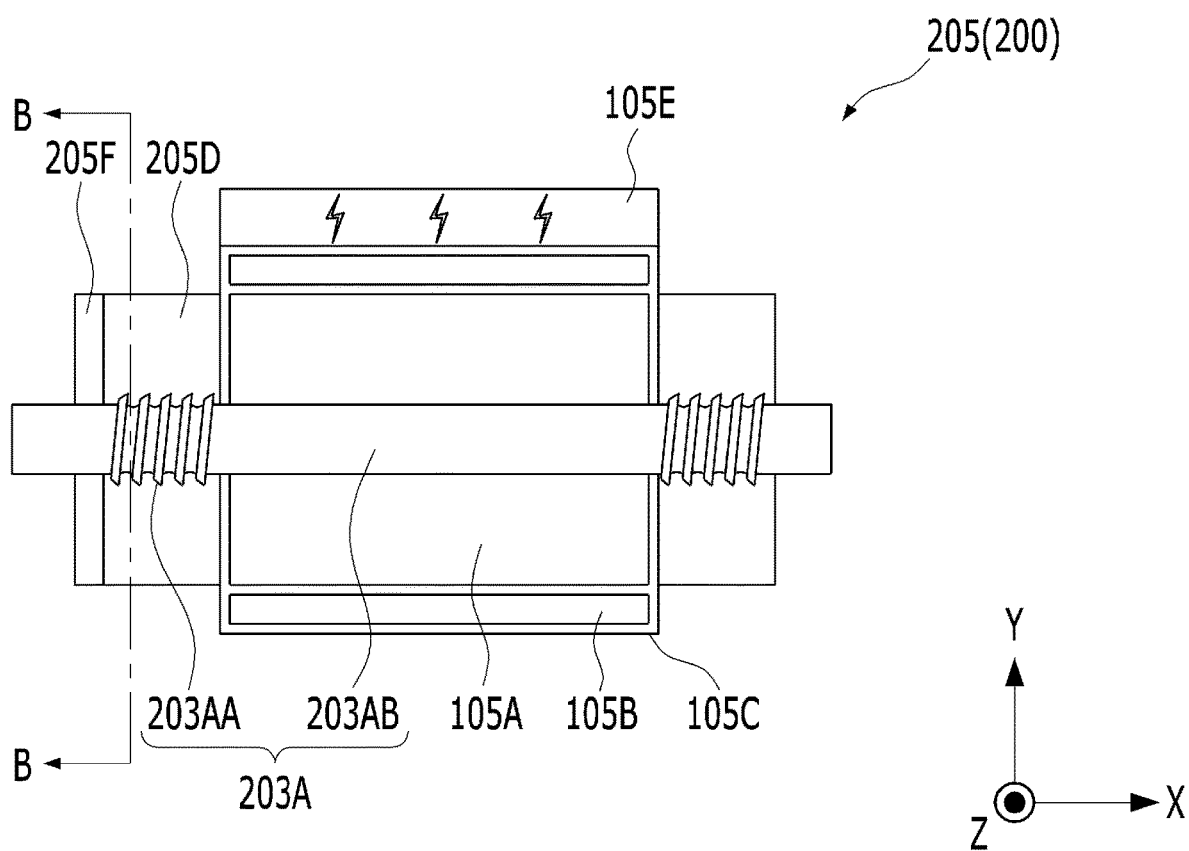
FIG. 5 is a cross-sectional view schematically illustrating a self-generating device 205 that may be applied as the self-generating device shown in FIGS. 1A and 1B according to another embodiment of the present invention.
Figure 6:
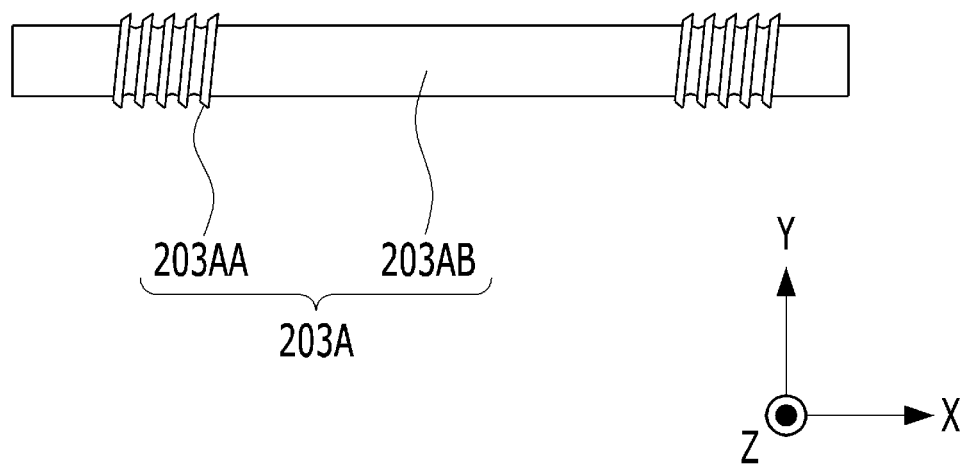
FIG. 6 is a side view schematically illustrating a drive shaft 203A having an external screw portion 203AA shown in FIG. 5.
Figure 7A:
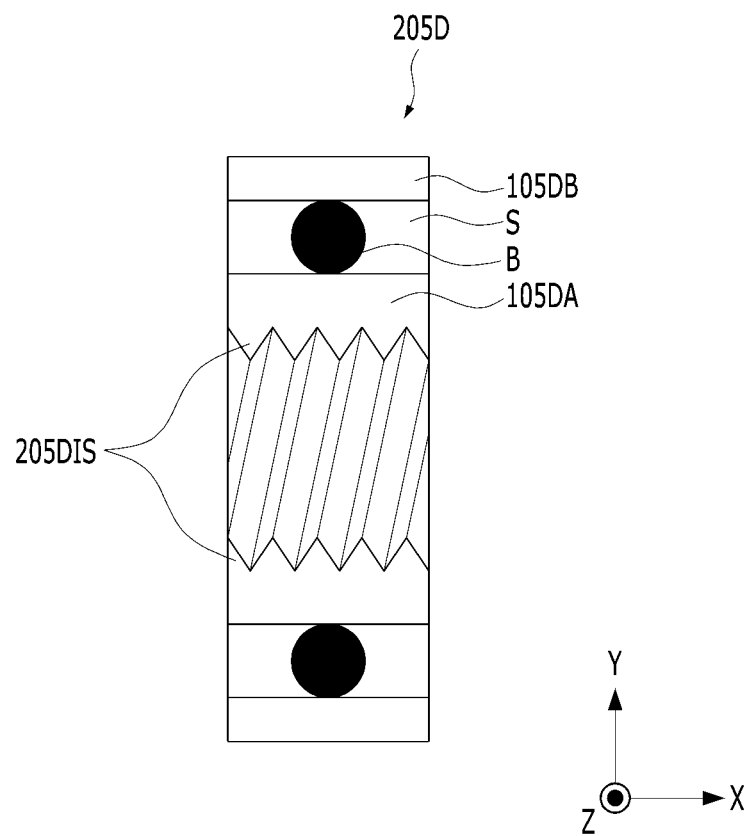
FIGS. 7A to 7c are magnified views schematically illustrating various bearings 205D, 205D', 205D" that may be applied as the bearing of the self-generating device 205 shown in FIG. 5 according to embodiments of the present invention.
Figure 7B:
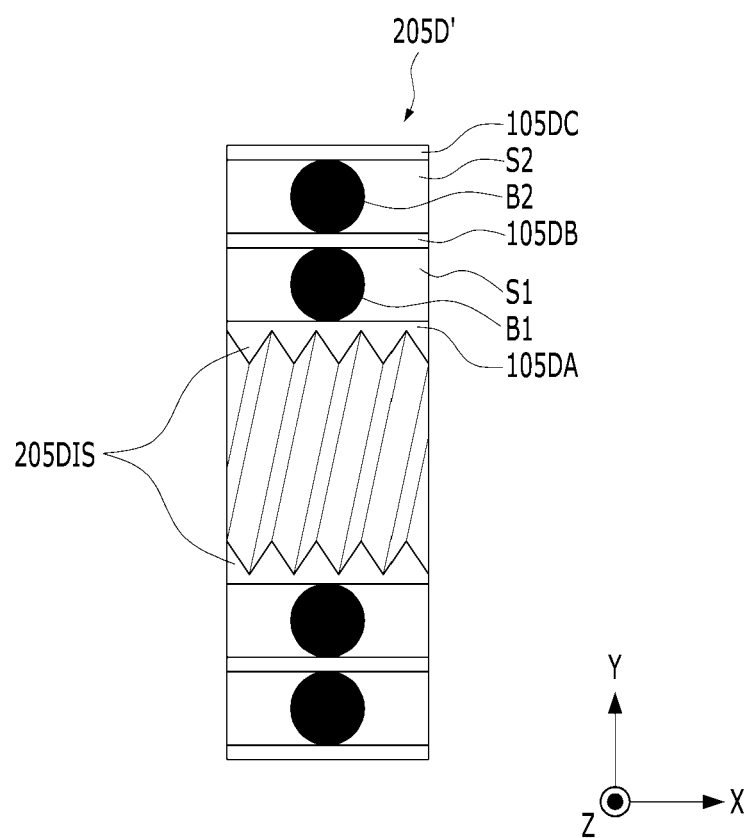
Figure 7C:
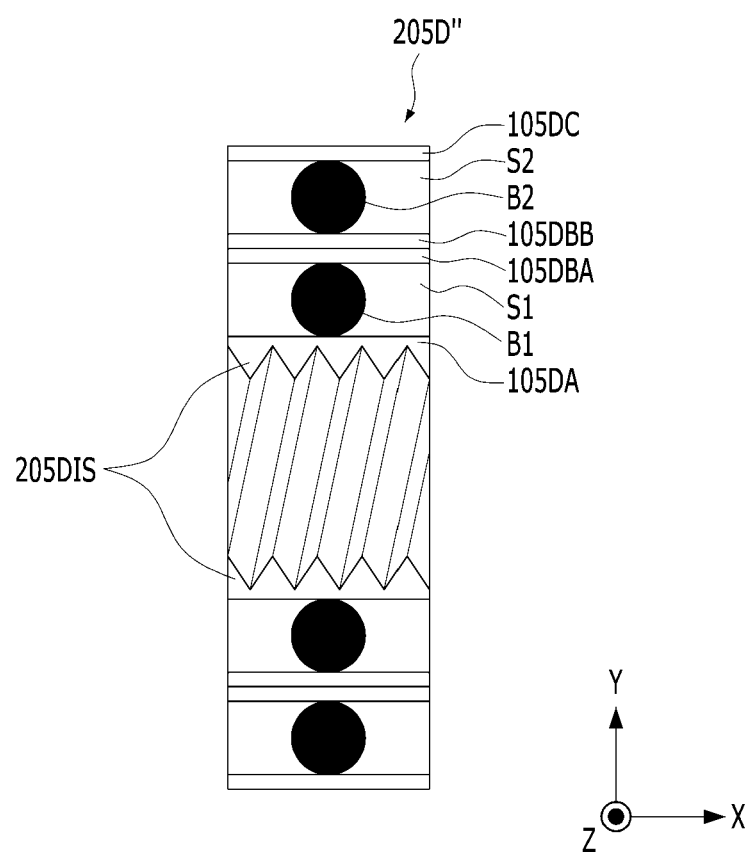
Figure 8A:
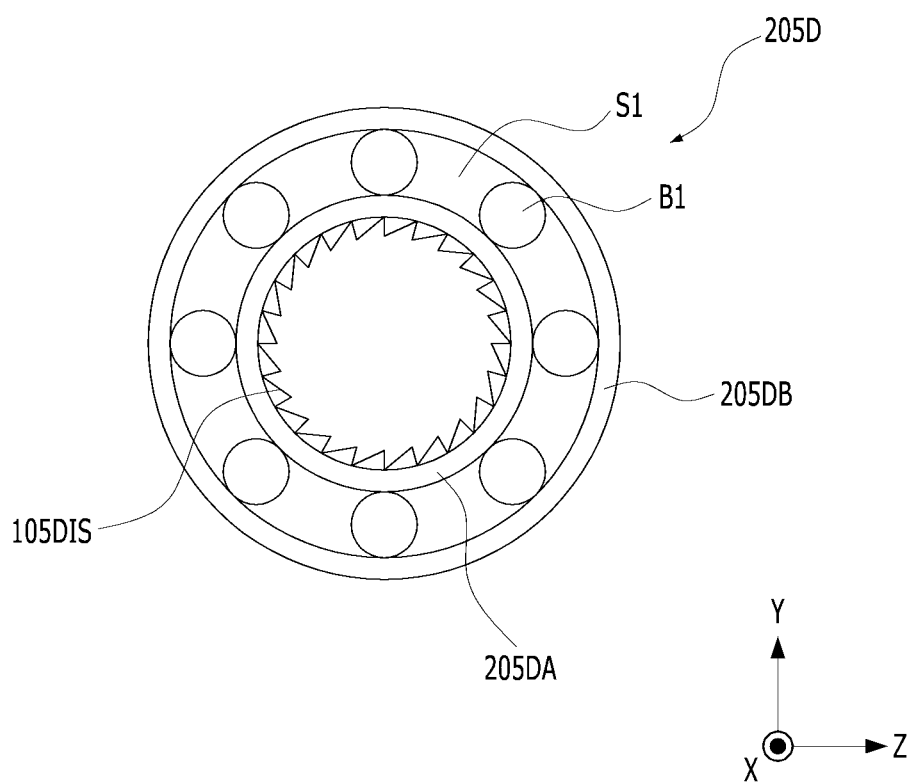
FIGS. 8A to 8c are cross-sectional views taken along line B-B of FIG. 5 and illustrating the bearings 205D, 205D', 205D" shown in FIGS. 7A to 7c.
Figure 8B:
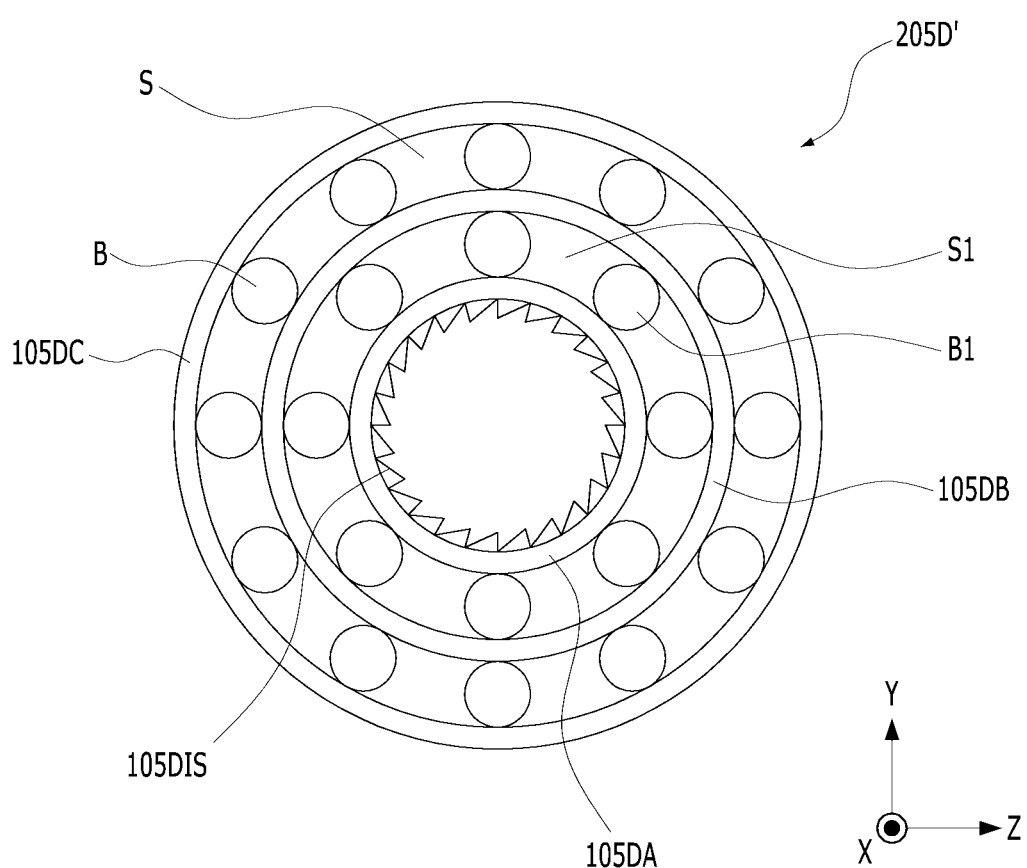
Figure 8C:
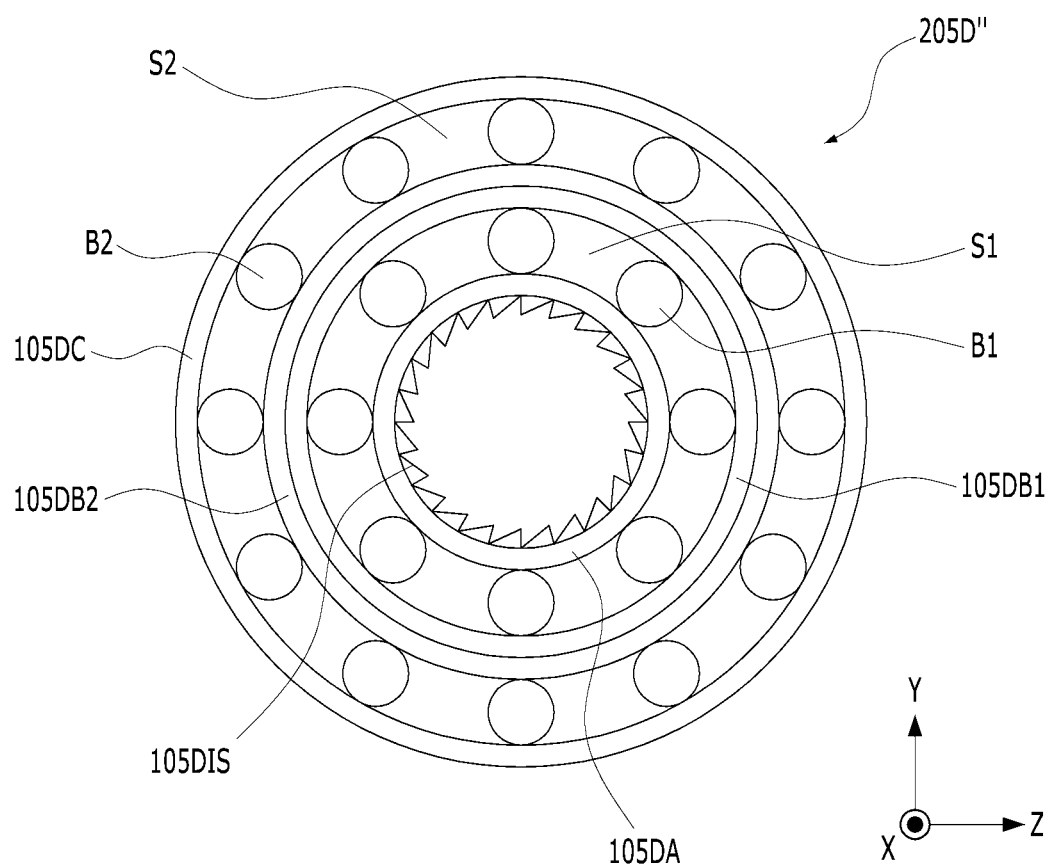

FIG. 5 is a cross-sectional view schematically illustrating a self-generating device 205 that may be applied as the self-generating device shown in FIGS. 1A and 1B according to another embodiment of the present invention. FIG. 6 is a side view schematically illustrating a drive shaft 203A having an external screw portion 203AA shown in FIG. 5. FIGS. 7A to 7c are magnified views schematically illustrating various bearings 205D, 205D', 205D" that may be applied as the bearing of the self-generating device 205 shown in FIG. 5 according to embodiments of the present invention. FIGS. 8A to 8c are cross-sectional views taken along line B-B of FIG. 5 and illustrating the bearings 205D, 205D', 205D" shown in FIGS. 7A to 7c.

The self-generating device 205 shown in FIGS. 5 to 8c is similar to the self-generating device 105 shown in FIGS. 2 to 4B, but has a difference in a structure of a drive shaft 203A and a bearing 205D. The same element or component will be referred to as the same reference number, and detailed description regarding the elements or components mentioned above will be omitted.

Referring to FIGS. 5 and 6, the drive shaft 203A included in an automobile 200 and the self-generating device 205 has external screw portions 203AA positioned on both sides of a set of the rotor assembly 105A and the stator assembly 105B. The external screw portion 203AA has a raised helical thread protruded from an external surface of the drive shaft 203A.

In this instance, the self-generating device 205 comprises the bearing 205D mounted on the external screw portion 203AA of the drive shaft 203A. Referring to FIGS. 7A and 8B together, an internal side of a bore of the bearing 205D has an internal screw portion 205DIS that is engaged with the external screw portion 203AA of the drive shaft 203A. By engaging between the external screw portions 203AA of the drive shaft 203A and the internal screw portion 205DIS of the bearing 205D, the bearing 205D can be securely affixed to the drive shaft 203A regardless of the high-speed rotation of the drive shaft 203A, and can protect the set of the rotor assembly 105A and the stator assembly 105B.

As shown in FIGS. 7A and 8B, the bearing 205D may be a single bearing structure including a first race 105DA, a second race 105DB surrounding the first race 105DA, and balls B positioned in a space S between the first race 105DA and second race 105DB, but is not limited to.

In some embodiments, the self-generating device 205 may include a double bearing structure such as a bearing 205D', 205D" shown in FIGS. 7B, 7C, 8B, and 8C instead of the bearing 205D shown in FIGS. 7A and 8B.

Referring to FIGS. 7B and 8B, the bearing 205D' may include an inner bearing having a first race 105DA, a second race 105DB, and inner balls B1 positioned in a space S1 between the first and the second race 105DA, 105DB, and an outer bearing having the second race 105DB, a third race 105DC, and outer balls B2 positioned in a space S2 between the second and the third race 105DB, 105DC. In this instance, the internal surface 205DIS of the first race 105DA has an internal screw portion 205DIS that is engaged with the external screw portion 203AA of the drive shaft 203A.

Referring to FIGS. 7C and 8C, the bearing 205D" may include an inner bearing having a first race 105DA, a second race 105DBA, and inner balls B1 positioned in a space S1 between the first and the second race 105DA, 105DBA, and an outer bearing having a third race 105DBB, a fourth race 105DC, and outer balls B2 positioned in a space S2 between the third and fourth race 105DBB, 105DC. In this instance, the internal surface 205DIS of the first race 105DA has an internal screw portion 205DIS that is engaged with the external screw portion 203AA of the drive shaft 203A.

The self-generating device 205 may further comprise a blocking wall 205F next to the bearing 205D to secure the bearing 205D.

Figure 9:
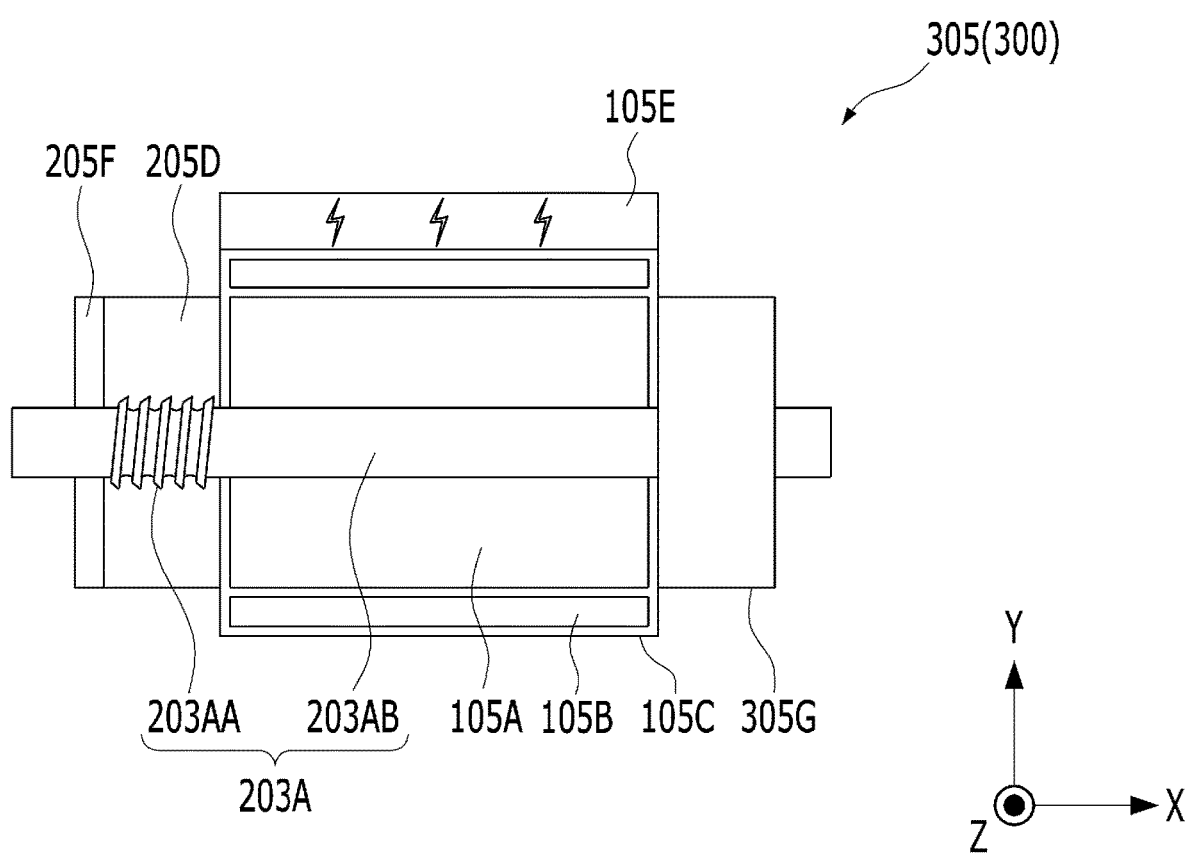
FIG. 9 is a cross-sectional view schematically illustrating a self-generating device 305 that may be applied as the self-generating device shown in FIGS. 1A and 1B according to another embodiment of the present invention.

FIG. 9 is a cross-sectional view schematically illustrating a self-generating device 305 that may be applied as the self-generating device shown in FIGS. 1A and 1B according to another embodiment of the present invention.

The self-generating device 305 shown in FIG. 9 is similar to the self-generating device 205 shown in FIGS. 5 to 8, but the drive shaft 203A shown in FIG. 9 has an external screw portion 203AA on only one side of a set of the rotor assembly 105A and the stator assembly 105B. Accordingly, the external screw portion 203AA is engaged with the bearing 205D, 205D', 205D" having the internal screw portion 205DIS. The other side of the set of the rotor assembly 105A and the stator assembly 105B may have another type of bearing 305G such as the bearing 105 shown in FIG. 2.

By applying the single external screw portion 203AA, the set of the rotor assembly 105A and the stator assembly 105B can be securely affixed to the drive shaft 203A, and at the same time, the cost for manufacturing the self-generating device 305 can be reduced.

Figure 10:
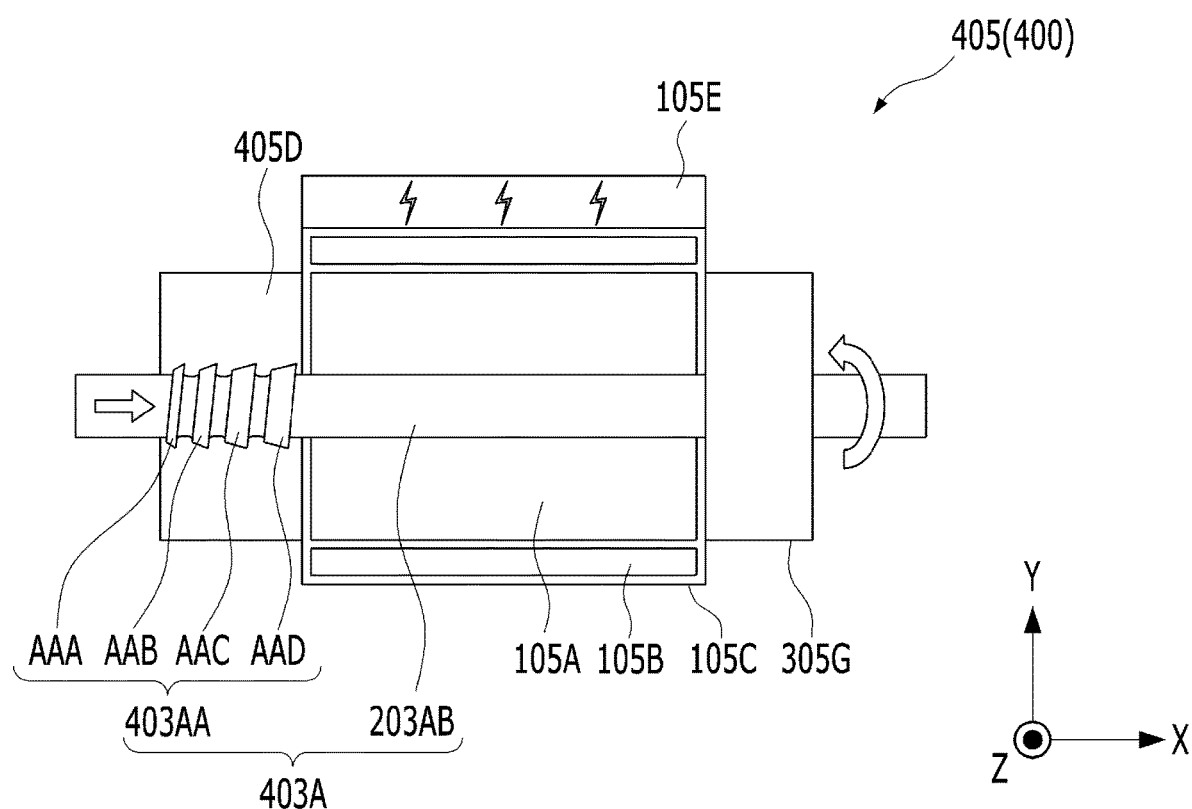
FIG. 10 is a cross-sectional view schematically illustrating a self-generating device 405 that may be applied as the self-generating device shown in FIGS. 1A and 1B according to another embodiment of the present invention.
Figure 11:
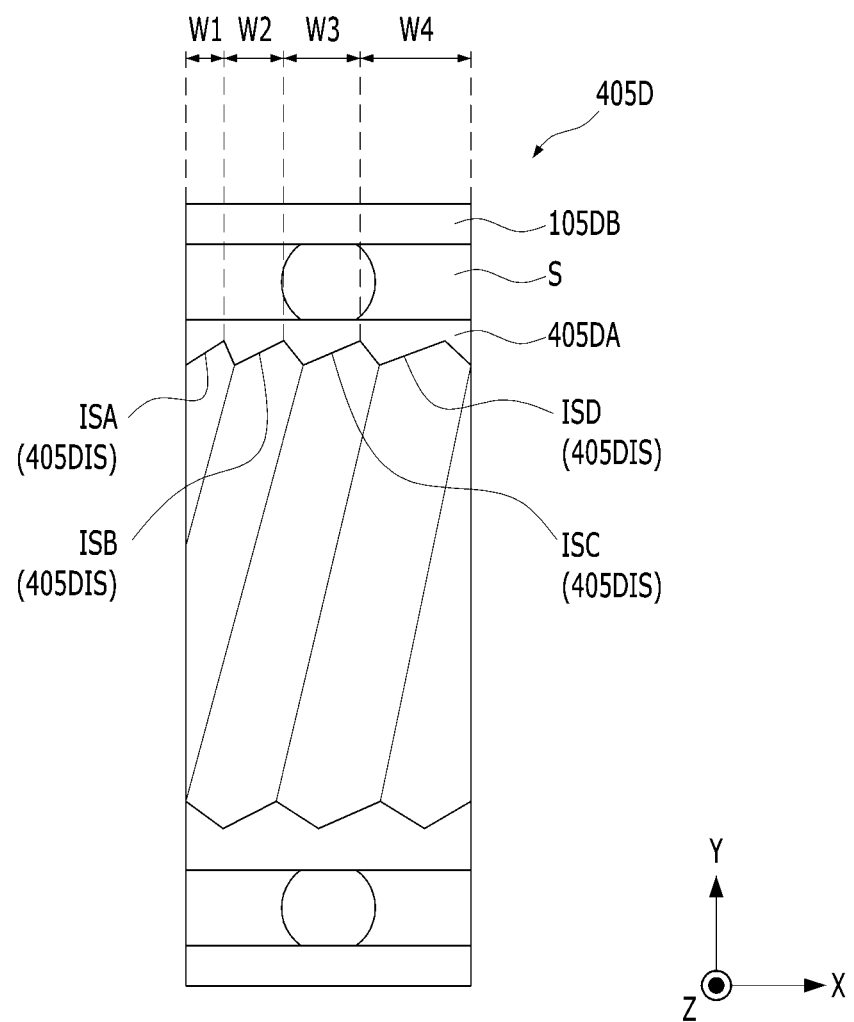
FIG. 11 is a magnified view schematically illustrating a bearing 405D of the self-generating device 405 shown in FIG. 10.

FIG. 10 is a cross-sectional view schematically illustrating a self-generating device 405 that may be applied as the self-generating device 105 shown in FIGS. 1A and 1B according to another embodiment of the present invention. FIG. 11 is a magnified view schematically illustrating a bearing 405D of the self-generating device 405 shown in FIG. 10. The self-generating device 405 shown in FIG. 10 is similar to the self-generating device 205, 305 shown in FIGS. 5 to 9, but a structure of an external screw portion 403AA of a drive shaft 403A and a bearing 405D in FIGS. 10 and 11 are different from those in FIGS. 5 to 9.

Referring to FIGS. 10 and 11, the external screw portion 403AA of the drive shaft 403A includes a raised helical thread AAA, AAB, AAC, AAD. In this instance, a width of the raised helical thread AAA, AAB, AAC, AAD becomes wider as the raised helical thread is closer to the set of the rotor assembly 105A and the stator assembly 105B.

Accordingly, the bearing 405D mounted on the external screw portion 203AA includes an internal screw portion 205DIS on an internal side of a bore of the bearing 205D, which is engaged with the external screw portion 403AA of the drive shaft 403A. The internal screw portion 205DIS includes a depressed helical trench ISA, ISB, ISC, ISD. In this instance, a width W1, W2, W3, W4 of the depressed helical trench ISA, ISB, ISC, ISD becomes wider as the raised helical thread is closer to the set of the rotor assembly 105A and the stator assembly 105B.

The bearing 405D may include a first race 405DA, a second race 105DB, and balls in a space S therebetween. The internal screw portion 205DIS is formed on the internal side of the first race 405DA. In other embodiments, the bearing 405D may be replaced with a double bearing structure shown in FIGS. 3A to 4B, 7B, 7C, 8B, and 8C.

By engaging between the external screw portions 403AA of the drive shaft 403A and the internal screw portion 405DIS of the bearing 405D, the bearing 405D can be more securely affixed to the drive shaft 403A regardless of the high-speed rotation of the drive shaft 403A, and can protect the set of the rotor assembly 105A and the stator assembly 105B.

Figure 14:
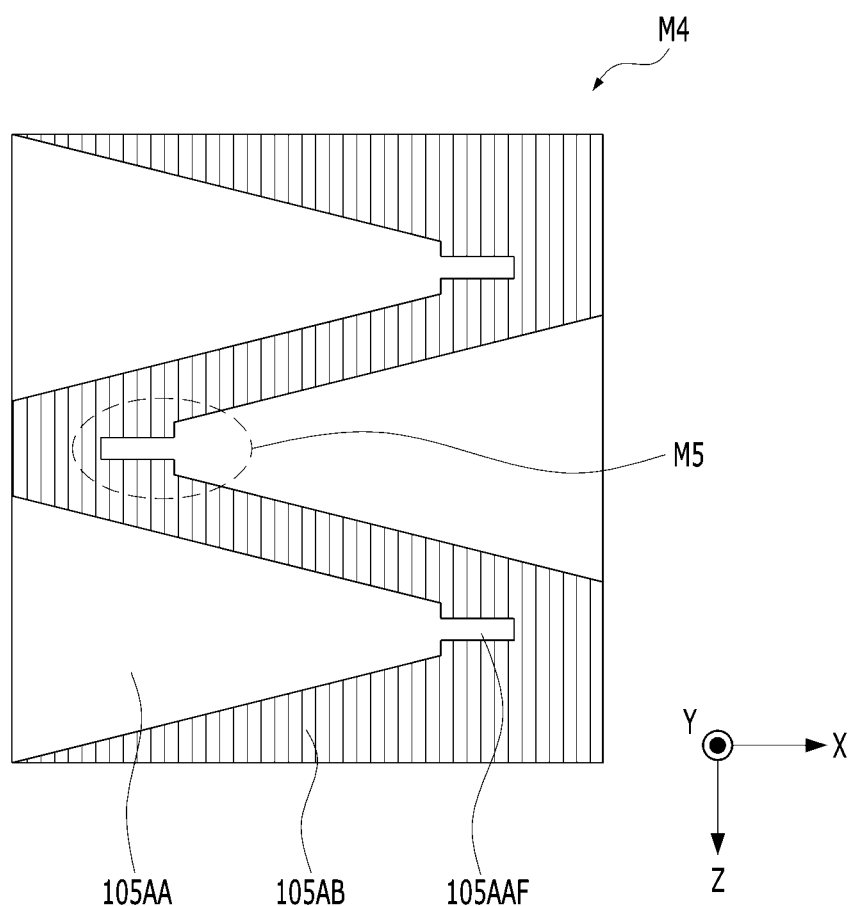
FIG. 14 is a magnified view M4 of FIG. 12 schematically illustrating a cooling fan 105AAF of a claw pole 105AA shown in FIGS. 12 and 13.
Figure 15:
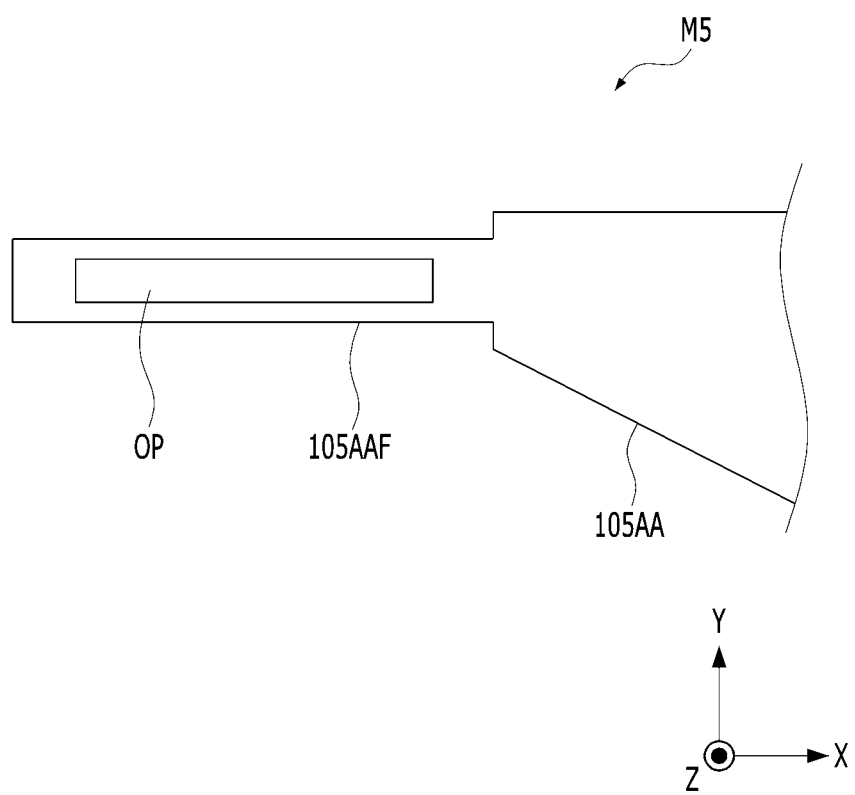
FIG. 15 is a magnified side view M5 of the cooling fan 105AAF shown in FIG. 14.

FIG. 12 is a perspective view schematically illustrating a rotor assembly 105A and a stator assembly 105B of the self-generating device 105 shown in FIGS. 1A and 1B. FIG. 13 is an exploded view schematically illustrating a rotor assembly 105A and a stator assembly 105B of the self-generating device 105 shown in FIGS. 1A and 1B. FIG. 14 is a magnified view M4 of FIG. 12 schematically illustrating a cooling fan 105AAF of a claw pole 105AA shown in FIGS. 12 and 13. FIG. 15 is a magnified side view M5 of the cooling fan 105AAF shown in FIG. 14.

Referring to FIGS. 12 to 15, the rotor assembly 105A may include a core 105AC, wire windings 105AB wound on the core 105AC, and two claw poles 105AA covering the core 105AC with the windings 105AB from both sides thereof.

The stator assembly 105B surrounds the rotor assembly 105A, is affixed to a body (not shown) of the automobile 100, and stays stationary relative to the rotation of the rotor assembly 105A. The stator assembly 105B may include a core 105BA and wire windings 105BB wound on the core 105BA. With the rotation of the rotor assembly 105A, magnetic field formed by the cores 105AC, 105BA change, thereby inducing electricity in the windings 105AB, 105BB.

In this instance, the claw poles 105AA has a plurality of claws, and a tip of the claw is combined with a cooling fan 105AAF. The cooling fan 105AAF has a long-shaped structure extended from the tip of the claw and has a long-shaped opening OP on the lateral side thereof, which enables air to pass therethrough.

The cooling fan 105AAF can form strong wind and supply airflow into the core 105BA and wire windings 105BB of the stator assembly 105B, and the core 105AC and wire windings 105AB of the rotor assembly 105A from the nearest location. Therefore, cooling fan 105AAF can prevent the drive shaft 103A and the set of the rotor assembly 105A and the stator assembly 105B from overheating caused by the high-speed rotation, and can maximize cooling effect, thereby improving efficiency of the self-generating device 500.

In FIGS. 12 and 13, the claw poles 105AA have 12 cooling fans 105AAF each fused on each tip of 12 claws, respectively, but is not limited to. The number of the cooling fans 105AAF may be varied.

Figure 16:
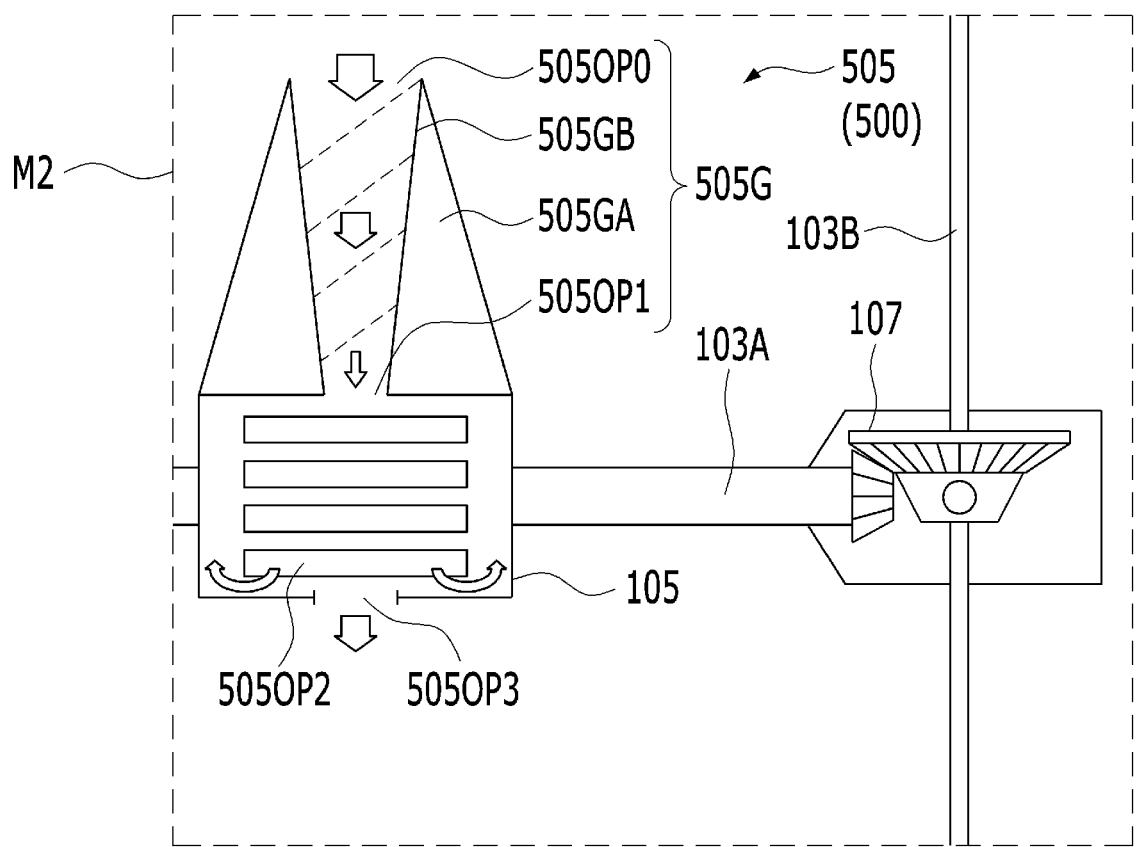
FIG. 16 is a partial view M2 of FIG. 1A schematically illustrating an automobile 500 equipped with a self-generating device 505 including a cooling part 505G according to another embodiment of the present invention.
Figure 17:
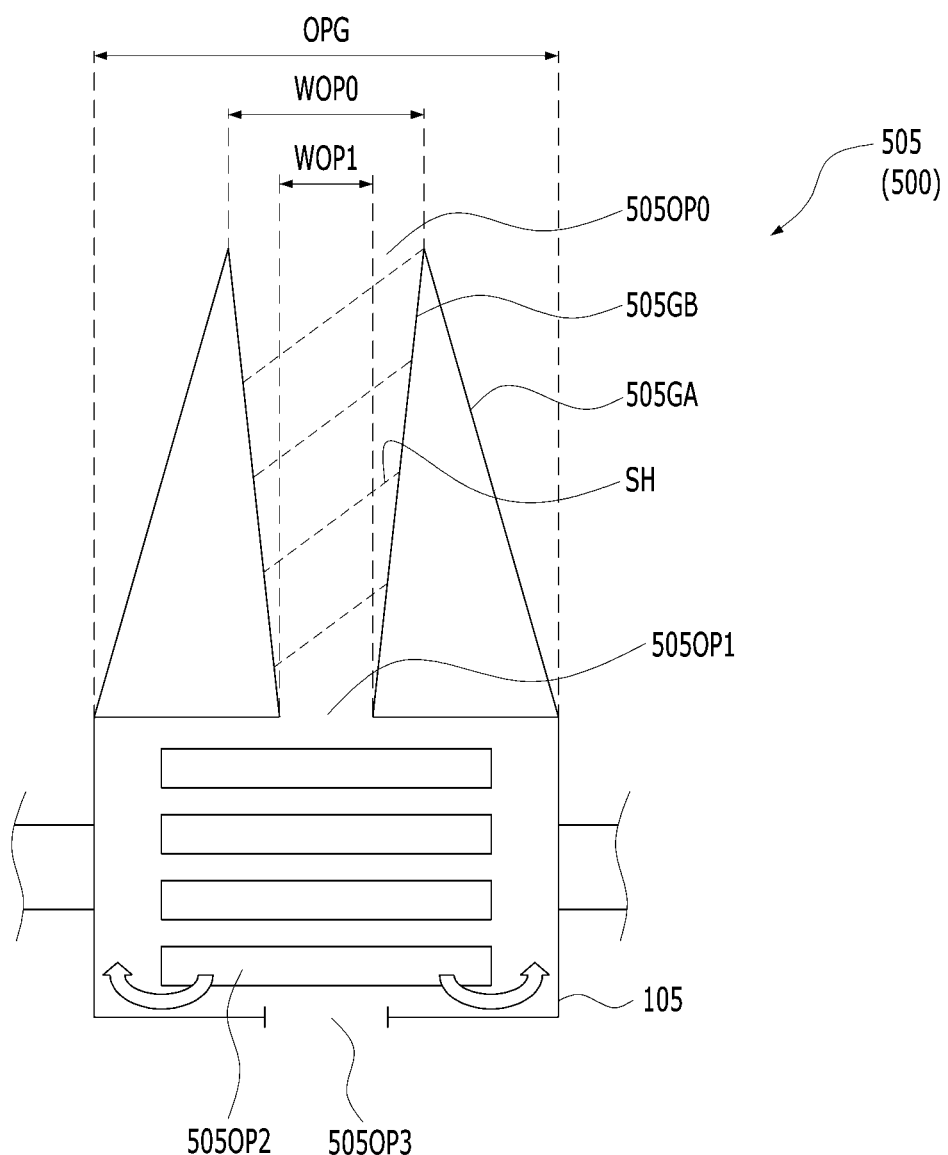
FIG. 17 is a drawing to explain the cooling part 505G of the self-generating device 505 shown in FIG. 16.

FIG. 16 is a partial view M2 of FIG. 1A schematically illustrating an automobile 500 equipped with a self-generating device 505 including a cooling part 505G according to another embodiment of the present invention. FIG. 17 is a drawing to explain the cooling part 505G of the self-generating device 505 shown in FIG. 16.

Referring to FIGS. 1A, 16, and 17, the self-generating device 505 includes a cooling part 505G combined with the housing 105C. The cooling part 505G includes a duct 505GA having an external side combined with the housing 105C and an internal passage 505 GB that air passes through and communicates with an inside of the housing 105C. The internal passage 505 GB communicates with the outside through a first opening 5050P0 of the duct 505GA, communicates with the inside of the housing 105C through a second opening 5050P1.

In this instance, a diameter of the external side of the duct 505GA becomes narrower as the duct 505GA is away from the housing 105C. Accordingly, a diameter OPG of an end of the external side of the duct 505GA, which is contact with the housing 105C, is wider than a diameter WOP0 of the other end of the external side of the duct 505GA.

In addition, a diameter of the internal passage 505 GB of the duct 505GA becomes wider as the duct 505GA is away from the housing 105C. Accordingly, a diameter WOP1 of an end of the internal passage 505 GB, which is closer to the housing 105C than the other end, is narrower than a diameter WOP0 of the other end of the internal passage 505 GB.

Furthermore, the internal passage 505 GB of the duct 505GA has a spiral helix SH protruded from an internal surface of the internal passage 505 GB, and a diameter of the spiral helix becomes wider as the internal passage 505 GB is away from the housing 105C.

The housing 103C may include a plurality of openings 505P2, 505P3, and discharge overheated air to the outside.

As shown in FIGS. 16 and 17, the streamlined duct 505 GB and streamlined internal passage 505 GB with the spiral helix SH forms vortex gale and supplies the vortex gale into the drive shaft 103A and the set of the rotor assembly 105A and the stator assembly 105B. The supplied vortex gale can prevent the drive shaft 103A and the set of the rotor assembly 105A and the stator assembly 105B from overheating, and can maximize cooling effect, thereby improving efficiency of the self-generating device 500.

Figure 18:
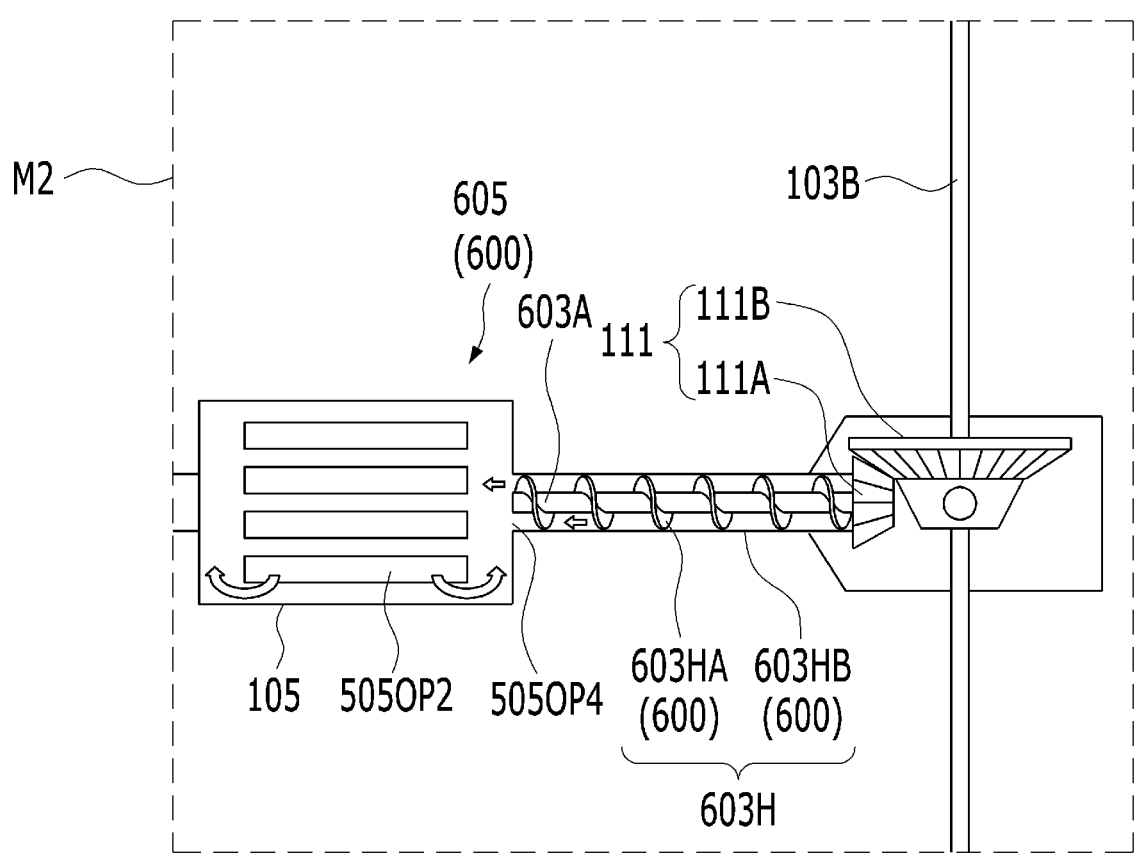
FIG. 18 corresponds to a partial view M2 of FIG. 1A and schematically illustrates an automobile 600 equipped with a self-generating device 605 having a main shaft 103A with a vortex generating portion 603H according to another embodiment of the present invention.

FIG. 18 corresponds to a partial view M2 of FIG. 1A, and schematically illustrates an automobile 600 equipped with a self-generating device 605 according to another embodiment of the present invention. The self-generating device 605 is similar to a self-generating device 105 shown in FIG. 1A, but has a difference in a structure of a drive shaft 603A having a vortex generating portion 603H.

Referring to FIGS. 1A and 18, the drive shaft 603A includes the vortex generating portion 603H positioned right next to a set of the rotor assembly 105A and the stator assembly 105B.

The vortex generating portion 603H has a helical wing 603HA and a tube 603HB receiving the helical wing 603HA. The helical wing 603HA is protruded from a surface of the drive shaft 603A and forms vortex airflow according to rotation of the drive shaft 603A. The tube 603HB is combined with the housing 103C and communicates with the housing 105C through an opening 5050P4. The vortex airflow is transferred into the set of the rotor assembly 105A and the stator assembly 105B through the tube 603HB and the opening 5050P4.

As shown in FIG. 18, the supplied vortex airflow can prevent the drive shaft 603A and the set of the rotor assembly 105A and the stator assembly 105B from overheating, and can maximize cooling effect, thereby improving efficiency of the self-generating device 600.

Figure 19:
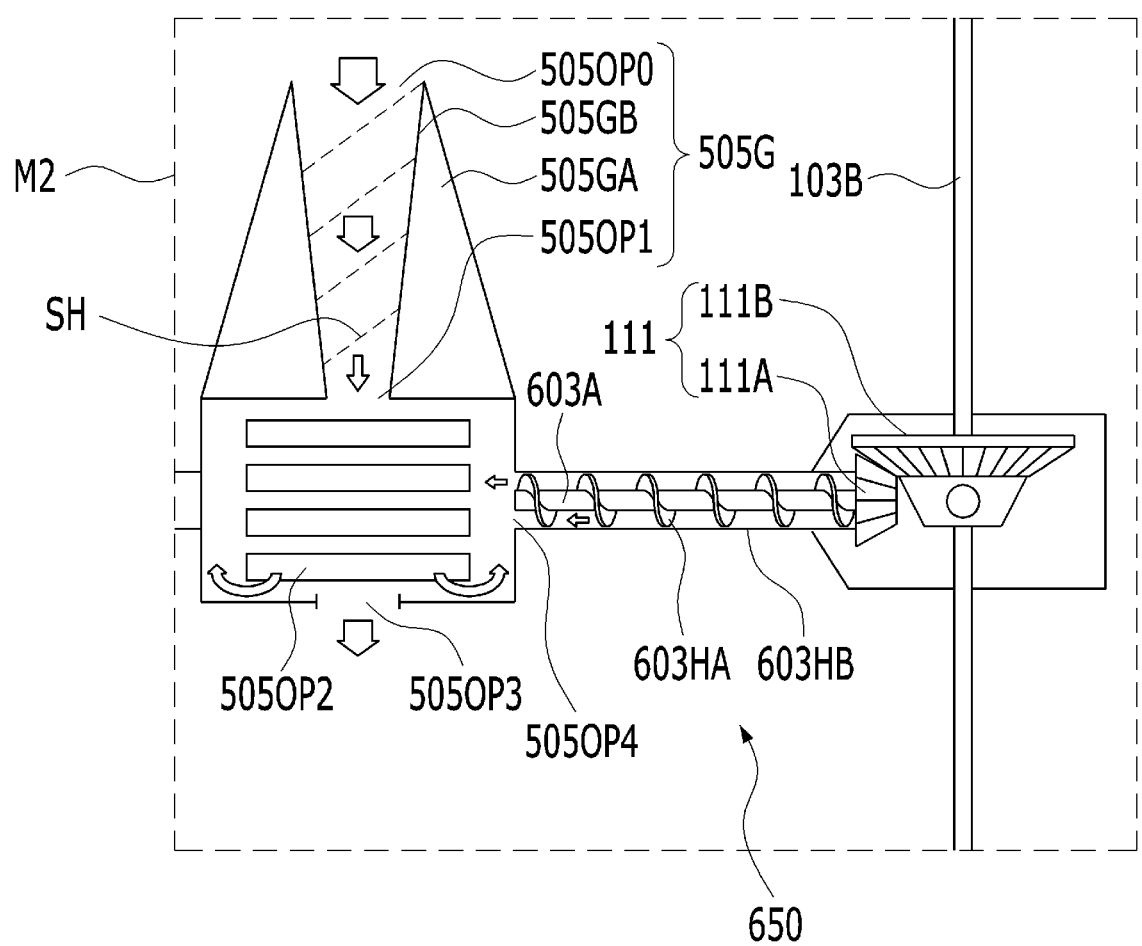
FIG. 19 corresponds to a partial view M2 of FIG. 1A and schematically illustrates an automobile 650 equipped with a self-generating device 505 including a cooling part 505G and a main shaft 103A having a vortex generating portion 603H according to another embodiment of the present invention.

FIG. 19 corresponds to a partial view M2 of FIG. 1A and schematically illustrates an automobile 650 equipped with a self-generating device 505 including a cooling part 505G and a main shaft 103A having a vortex generating portion 603H according to another embodiment of the present invention.

Referring to FIG. 19, the self-generating device 650 is similar to self-generating devices 105, 500, 600 shown in FIG. 1A, 16 to 18, but has a difference in that the self-generating device 650 includes both the cooling part 505G and the vortex generating portion 603H.

Referring to FIGS. 1A, 2, and 19, the self-generating device 650 has the cooling part 505G and the vortex generating part 603H combined with the housing 105C. The internal passage 505 GB and the spiral helix SH of the cooling part 505G and the helical wing 103HA and the tube 603HB of the vortex generating part 603H form vortex airflow and can prevent the drive shaft 603A and the set of the rotor assembly 105A and the stator assembly 105B from overheating, and can maximize cooling effect, thereby improving efficiency of the self-generating device 650.

Figure 20:
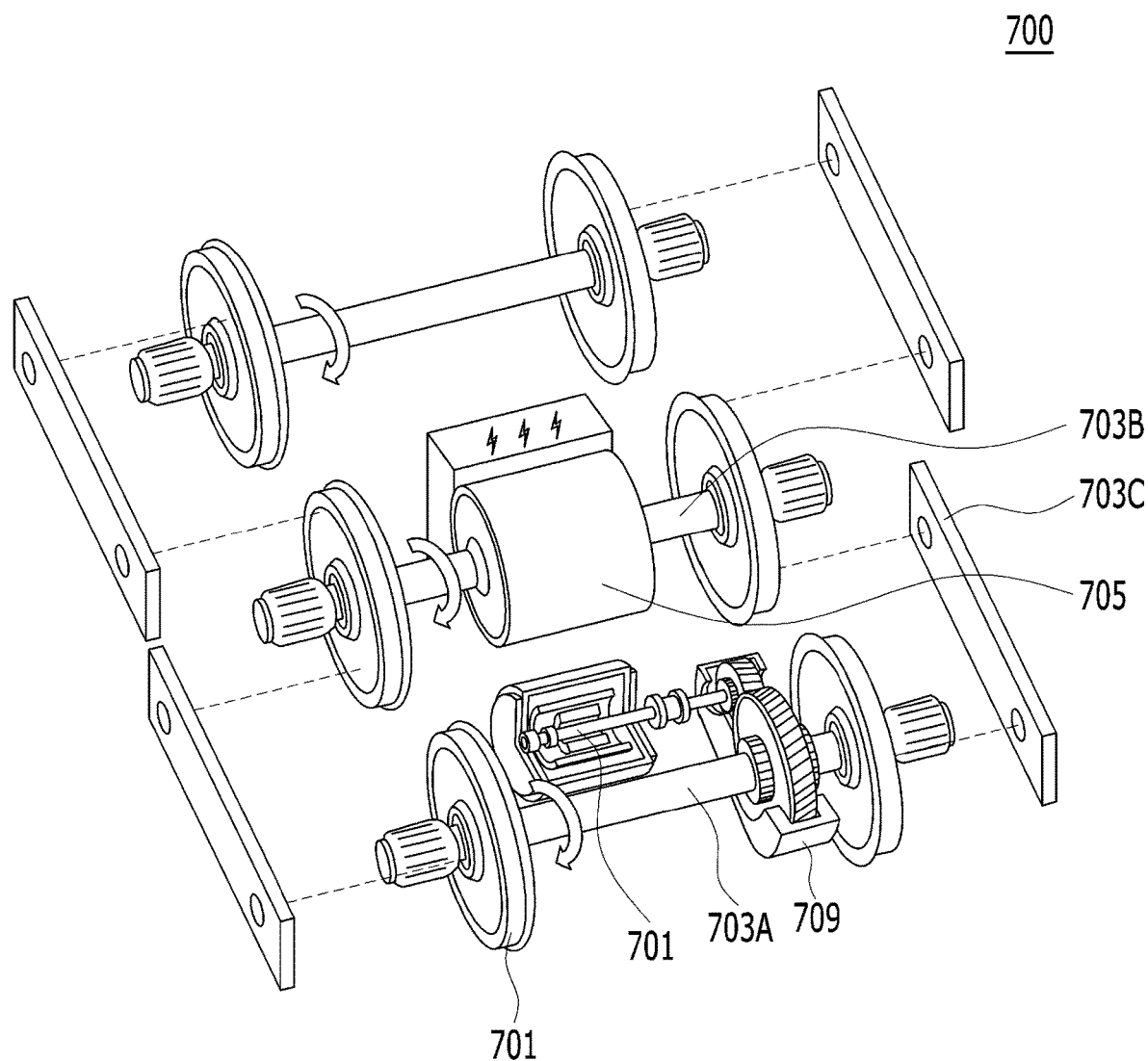
FIG. 20 is a perspective view schematically illustrating a self-generating device 705 and a railway vehicle 700 equipped with the self-generating device 705 according to one embodiment of a self-generating device and a mechanical system using the same of the present invention.
Figure 21:
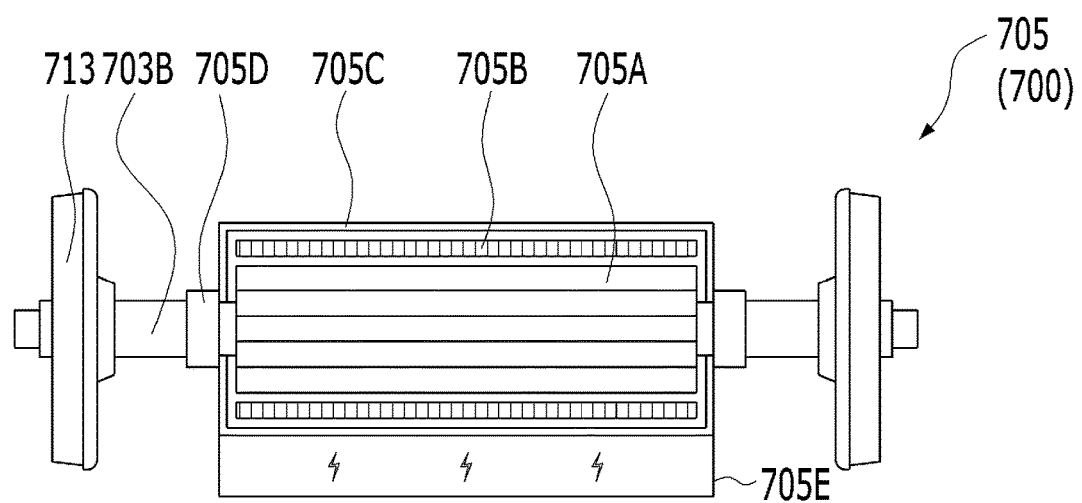
FIG. 21 is a cross-sectional view schematically illustrating a self-generating device 705 that may be applied as the self-generating device shown in FIG. 20 according to one embodiment of the present invention.
Figure 21:
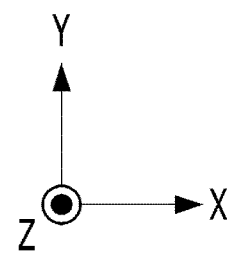
Figure 22:
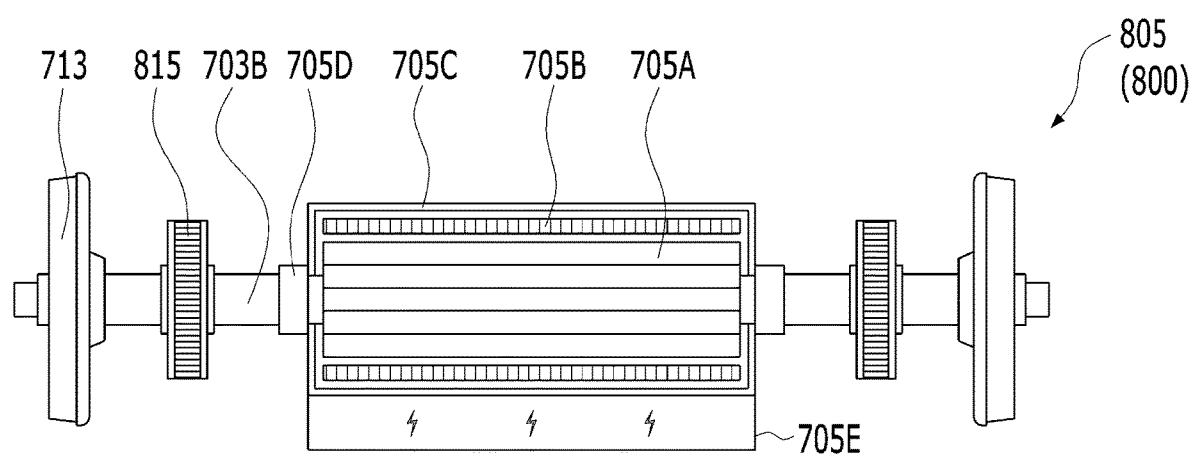
FIG. 22 is a cross-sectional view schematically illustrating a self-generating device 805 that may be applied as the self-generating device shown in FIG. 20 according to another embodiment of the present invention.

FIG. 20 is a perspective view schematically illustrating a self-generating device 705 and a railway vehicle 700 equipped with the self-generating device 705 according to one embodiment of a self-generating device and a mechanical system using the same of the present invention. FIG. 21 is a cross-sectional view schematically illustrating a self-generating device 705 that may be applied as the self-generating device shown in FIG. 20 according to one embodiment of the present invention. FIG. 22 is a cross-sectional view schematically illustrating a self-generating device 805 that may be applied as the self-generating device shown in FIG. 20 according to another embodiment of the present invention.

Referring to FIG. 20, a self-generating device 705 may be applied to other mechanical system such as a railway vehicle 700. The railway vehicle 700 comprises an engine 701, a plurality of axle shafts 703A, 703B, coupling rods 703C, a self-generating device 705, a transmission 709, and wheels 713. Each of the axle shafts 703A, 703B connects between a pair of wheels 713 and rotates according to the rotation of the engine 701.

The engine 701 may be mounted on a first axle shaft 703A of the plurality of axle shafts, and the self-generating device 705 may be mounted on a second axle shaft 703B of the plurality of axle shafts. The rotational force powered by the engine 701 is transferred to the self-generating device 705 through the first and second axle shaft 703A, 703B, and the coupling rod connecting between the first and the second axle shaft 703A, 703A at both ends thereof.

Referring to FIGS. 21 and 22 together, the self-generating device 705 may comprise the axle shaft 703B, a rotor assembly 705A combined with the axle shaft 703B and rotating along with the axle shaft 703B according to the rotational force, a stator assembly 705B surrounding the rotor assembly 705A, and a battery 705E. A set of the rotor assembly 705A and the stator assembly 705B may be received in a housing 705C, and the set may be protected by bearings 705D positioned on both sides thereof. As shown in FIG. 22, a railway vehicle 800 may further comprise disc brakes 815 at both sides of a self-generating device 805.

In some embodiments, the axle shaft 703B, the rotor assembly 705A, the stator assembly 705B, and the bearing 705D may be embodied as structures shown in FIGS. 2 to 19.

Figure 23A:
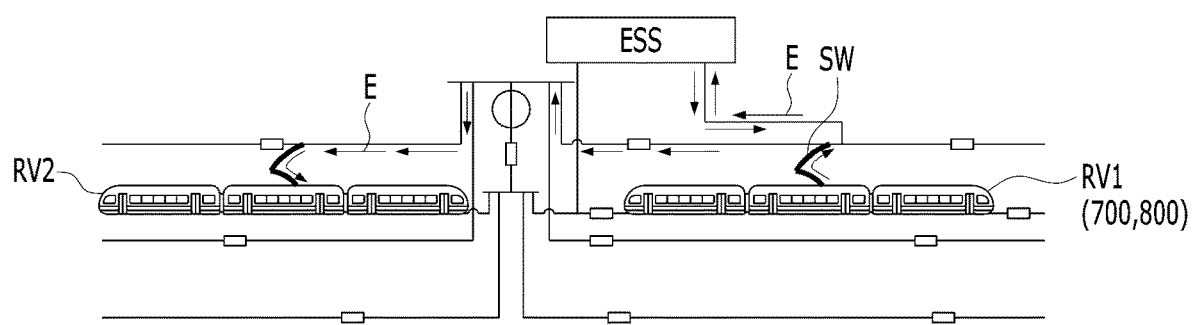
FIGS. 23A and 23B are a drawing schematically illustrating an electricity exchange system in which surplus electricity E generated from the self-generating device of the railway vehicle RV1 is transferred to another railway vehicle RV2 according to one embodiment of the present invention.
Figure 23B:
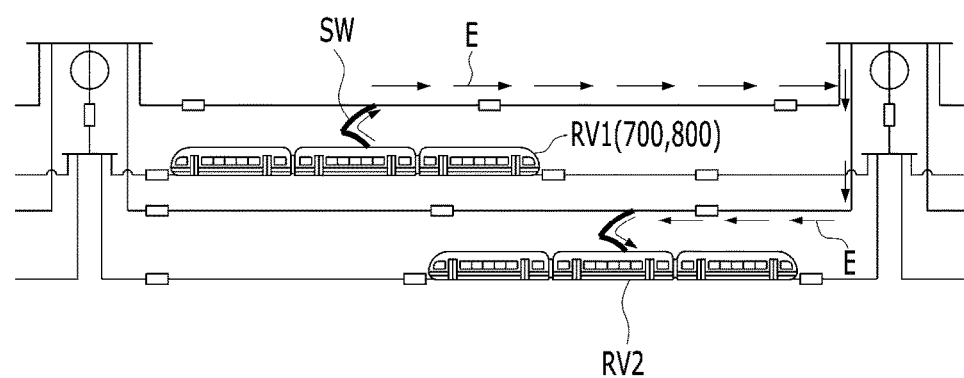

FIGS. 23A and 23B are a drawing schematically illustrating an electricity exchange system in which surplus electricity E generated from the self-generating device of the railway vehicle RV1 is transferred to another railway vehicle RV2 according to one embodiment of the present invention.

Referring to FIGS. 20 to 23B together, the self-generating device 705, 805 equipped in the railway vehicle 700, 800, RV1 may further comprise a supplying wire SW connecting between the battery 705E and common railway wirings that is connected to another railway vehicle RV2.

The self-generating device 705, 805 of the railway vehicle 700, 800, RV1 may transfer surplus electricity E of the induced electricity stored in the battery 705E to another railway vehicle RV2 through the supplying wire SW.

Figure 24:
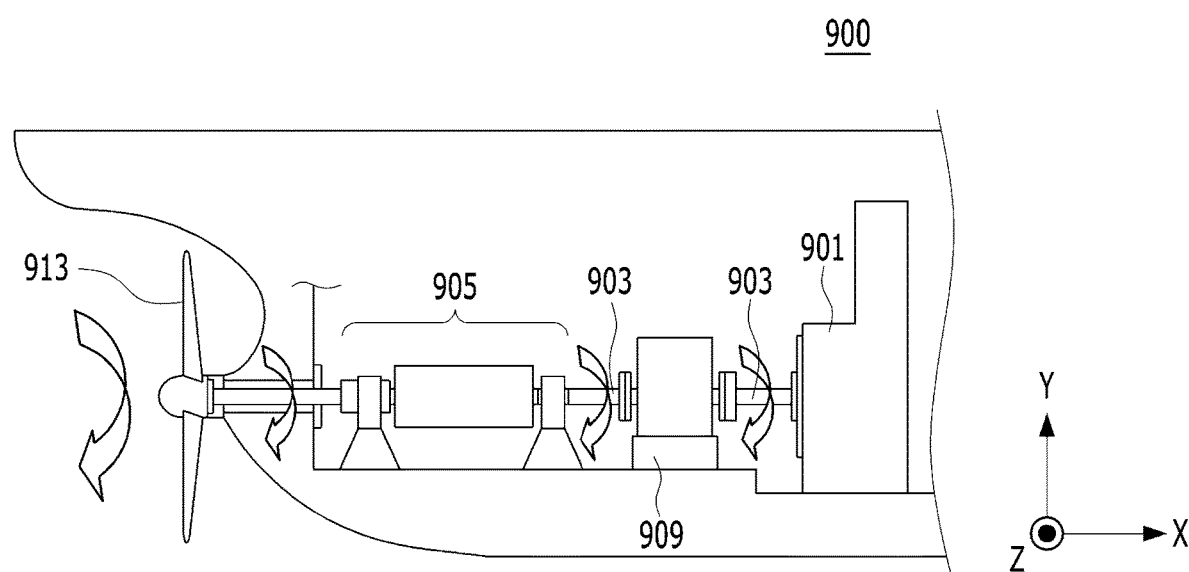
FIG. 24 is a side view schematically illustrating a self-generating device 905 and a ship 900 equipped with the self-generating device 905 according to one embodiment of a self-generating device and a mechanical system using the same of the present invention.
Figure 25:
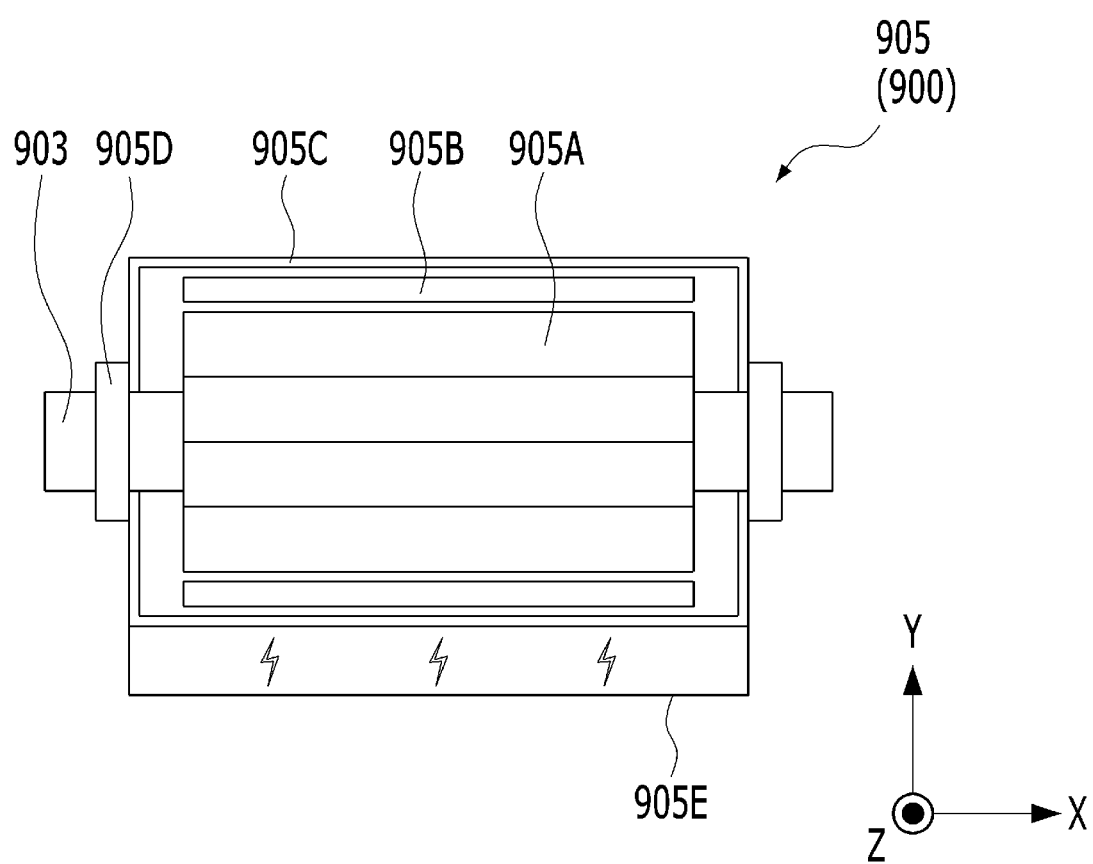
FIG. 25 is a cross-sectional view schematically illustrating a self-generating device 905 that may be applied as the self-generating device shown in FIG. 23 according to one embodiment of the present invention.

FIG. 24 is a side view schematically illustrating a self-generating device 905 and a ship 900 equipped with the self-generating device 905 according to one embodiment of a self-generating device and a mechanical system using the same of the present invention. FIG. 25 is a cross-sectional view schematically illustrating a self-generating device 905 that may be applied as the self-generating device shown in FIG. 23 according to one embodiment of the present invention.

Referring to FIG. 24, a self-generating device 905 may be applied to other mechanical system such as a ship 900. The ship 900 may comprise an engine 901, a propeller shaft 903, a self-generating device 905, a gear box 909, and a propeller 911.

The engine 901 is connected and transfers a rotational force to the propeller shaft 903 connected to the propeller 911. The propeller 911 rotates and drives the ship 900 at high speed.

Referring to FIG. 25 together, the self-generating device 905 may comprise the propeller shaft 903, a rotor assembly 905A combined with the propeller shaft 903 and rotating along with the propeller shaft 903 according to the rotational force, a stator assembly 905B surrounding the rotor assembly 905A, and a battery 905E. A set of the rotor assembly 905A and the stator assembly 905B may be received in a housing 905C, and the set may be protected by bearings 905D positioned on both sides thereof.

The self-generating device 905 combined with the propeller shaft 903 also rotates along with the propeller shaft 903, and can generate induced electricity using the rotation. The induced electricity may be stored in the battery and used in other parts of the ship 900 requiring electricity.

In some embodiments, the propeller shaft 903, the rotor assembly 705A, the stator assembly 705B, and the bearing 705D may be embodied as structures shown in FIGS. 2 to 19.

While the invention has been shown and described with reference to different embodiments thereof, it will be appreciated by those skilled in the art that variations in form, detail, compositions and operation may be made without departing from the spirit and scope of the invention as defined by the accompanying claims.

What is claimed is:

1. A self-generating device equipped in a mechanical system including a power generating part, an operating part, and a main shaft connecting between the power generating part and the operating part, the self-generating device comprising:
    the main shaft rotating according to a rotational force powered by the power generating part and transferring the rotational force to the operating part, wherein the operating part performs mechanical motion that the mechanical system aims at, using the transferred rotational force;
    a rotor assembly combined with the main shaft and rotating along with the main shaft according to the rotational force, and
    a stator assembly surrounding the rotor assembly and staying stationary relative to the rotation of the rotor assembly,
    wherein the at least one of the rotor assembly and the stator assembly generates a magnetic field, and the other one or both have wire windings in which change of the magnetic field induces electricity,
    wherein the main shaft includes at least one external screw portion positioned on at least one side of a set of the rotor assembly and the stator assembly, wherein the self-generating device further comprises a bearing mounted on the screw portion of the main shaft, wherein an internal side of a bore of the bearing has an internal screw portion that is engaged with the external screw portion of the main shaft, and
    wherein the external screw portion includes a raised helical thread, and a width of the raised helical thread becomes wider as the raised helical thread is closer to the set of the rotor assembly and the stator assembly, and wherein the internal screw portion includes a depressed helical trench, and a width of the depressed helical trench becomes wider as the depressed helical trench is closer to the set of the rotor assembly and the stator assembly.

2. The self-generating device of claim 1, wherein the mechanical system is an automobile, the power generating part is an engine, and the operating part is wheels,
    wherein the main shaft is a drive shaft connected to the engine and receives the rotational force from the engine.

3. The self-generating device of claim 1, wherein the mechanical system is an automobile, the power generating part is an engine, and the operating part is wheels,
    wherein the main shaft is an axle shaft connecting a pair of the wheels, wherein the axle shaft receives the rotational force from the engine through a differential and a drive shaft connecting between the engine and the axle shaft.

4. The self-generating device of claim 1, further comprising a battery receiving the induced electricity from the wire windings and transferring the induced electricity to the automobile.

5. The self-generating device of claim 1, further comprising a bearing mounted on a side of a set of the rotor assembly and the stator assembly, the bearing including:
   an inner bearing having a first race, a second race surrounding the first race, and inner balls positioned between the first and the second race, and
   an outer bearing having the second race, a third race surrounding the second race, and outer balls positioned between the second and the third race.

6. The self-generating device of claim 5, wherein a thickness of the second race is the same as any one of that of the first and the third race.

7. The self-generating device of claim 1, wherein the rotor assembly includes a core, wire windings wound on the core, and two claw poles covering the core with the wire windings from both sides thereof,
   wherein the claw pole has a plurality of claws, and a tip of the claw is combined with a cooling fan,
   wherein the cooling fan has a long-shaped structure extended from the tip of the claw and has a long-shaped opening that enables air to pass therethrough.

8. The self-generating device of claim 1, further comprising a housing receiving a set of the rotor assembly and the stator assembly, and a cooling part combined with the housing,
   wherein the cooling part includes a duct having an external side combined with the housing and an internal passage that air passes through and communicates with an inside of the housing,
   wherein a diameter of the external side of the duct becomes narrower as the duct is away from the housing, and a diameter of the internal passage of the duct becomes wider as the duct is away from the housing,
   wherein the internal passage of the duct has a spiral helix protruded from an internal surface thereof, and a diameter of the spiral helix becomes wider as the duct is away from the housing.

9. The self-generating device of claim 1, wherein the main shaft includes a vortex generating portion, and the vortex generating portion is positioned right next to a set of the rotor assembly and the stator assembly, and has a helical wing and a tube receiving the helical wing,
   wherein the helical wing is protruded from a surface of the main shaft and supplies vortex airflow through the tube toward the set of the rotor assembly and the stator assembly according to rotation of the main shaft.

10. The self-generating device of claim 9, further comprising a housing receiving a set of the rotor assembly and the stator assembly and a cooling part combined with the housing,
    wherein the tube is combined with the housing, and the vortex airflow is supplied to an inside of the housing through an opening of the housing,
    wherein the cooling part includes a duct having an external side combined with the housing and an internal passage that air passes through and communicates with the inside of the housing,
    wherein a diameter of the external side of the duct becomes narrower as the duct is away from the housing, and a diameter of the internal passage of the duct becomes wider as the duct is away from the housing.

11. The self-generating device of claim 1, wherein the mechanical system is a railway vehicle including a plurality of axle shafts connecting a pair of wheels, the power generating part is an engine, and the operating part is the wheels,
    wherein the main shaft is a first axle shaft of the plurality of axle shafts, and a second axle shaft of the plurality of the axle shafts is connected to the engine and receives the rotational force from the engine,
    wherein the first axle shaft receives the rotational force through coupling rods connecting between the first and the second axle shaft at both ends thereof.

12. The self-generating device of claim 11, further comprising a battery receiving the induced electricity from the wire windings and transferring the induced electricity into the railway vehicle.

13. The self-generating device of claim 12, further comprising a supplying wire connecting between the battery and common railway wirings that is connected to another railway vehicle,
    wherein the supplying wire transfers surplus electricity of the induced electricity stored in the battery to another railway vehicle.

14. The self-generating device of claim 1, wherein the mechanical system is a ship, the power generating part is an engine, and the operating part is a propeller,
    wherein the main shaft is a propeller shaft connected to the engine and converting a mechanical power generated by the engine into the rotational force.

15. A mechanical system equipped with a self-generating device, the mechanical system comprising:
    a power generating part generating power,
    a main shaft connected to the power generating part, receiving the power generated from the power generated part, and rotating with a rotational force using the power;
    an operating part receiving the rotational force from the main shaft and performing a mechanical motion that the mechanical system aims at, using the rotational force, and
    a self-generating part mounted on the main shaft and generating induced electricity using the rotational force, wherein the self-generating part including:
       the main shaft rotating according to the rotational force;
       a rotor assembly combined with the main shaft and rotating along with the main shaft according to the rotational force, and
       a stator assembly surrounding the rotor assembly and staying stationary relative to the rotation of the rotor assembly, wherein the at least one of the rotor and the stator generates a magnetic field and the other one or both have wire windings in which change of the magnetic field induces electricity;
    wherein the main shaft includes at least one external screw portion positioned on at least one side of a set of the rotor assembly and the stator assembly, and the self-generating device further comprises a bearing mounted on the screw portion of the main shaft,
    wherein the external screw portion includes a raised helical thread, and a width of the raised helical thread becomes wider as the raised helical thread is closer to the set of the rotor assembly and the stator assembly,
    wherein an internal side of a bore of the bearing has an internal screw portion that is engaged with the external screw portion of the main shaft, wherein the bearing includes:
an inner bearing having a first race, a second race surrounding the first race, and inner balls positioned between the first and the second race, and
an outer bearing having the second race, a third race surrounding the third race, and outer balls positioned between the second and the third race.

16. The mechanical system of claim 15, wherein the rotor assembly includes a core, windings wound on the core, and two claw poles covering the core with the windings from both sides thereof,
wherein the claw pole has a plurality of claws, and a tip of the claw is combined with a cooling fan, and the cooling fan has a long-shaped structure extended from the tip of the claw and has a long-shaped opening that enables air to pass therethrough,
wherein the self-generating part further includes a housing receiving a set of the rotor assembly and the stator assembly and a cooling part combined with the housing, and the cooling part includes a duct having an external side combined with the housing and an internal passage that air passes through and communicates with an inside of the housing,
wherein a width of the external side of the duct becomes narrower as the duct is away from the housing, and a diameter of the internal passage of the duct becomes wider as the duct is away from the housing,
wherein the internal passage of the duct has a spiral helix protruded from an internal surface thereof, and a diameter of the spiral helix becomes wider as the duct is away from the housing,
wherein the main shaft includes a vortex generating portion having a helical wing and a tube receiving the helical wing, and positioned right next to a set of the rotor assembly and the stator assembly,
wherein the helical wing is protruded from a surface of the main shaft and supplies vortex airflow through the tube toward the set of the rotor assembly and the stator assembly according to rotation of the main shaft.

* * * * *